Nov. 16, 1943.    F. E. SMITH    2,334,683
SEPARATION OF MATERIALS
Filed March 10, 1941    8 Sheets-Sheet 1

INVENTOR.
FRANK E. SMITH
BY
E. H. O'Brien
ATTORNEY.

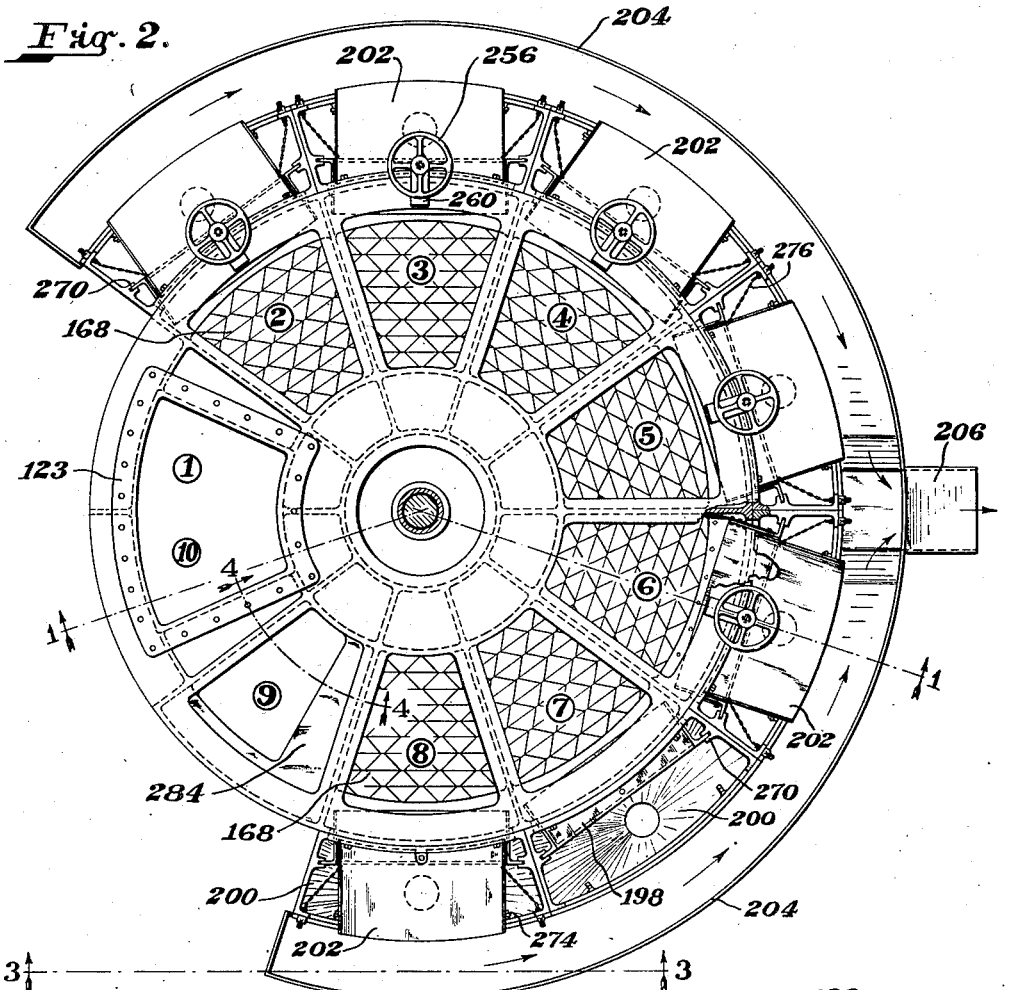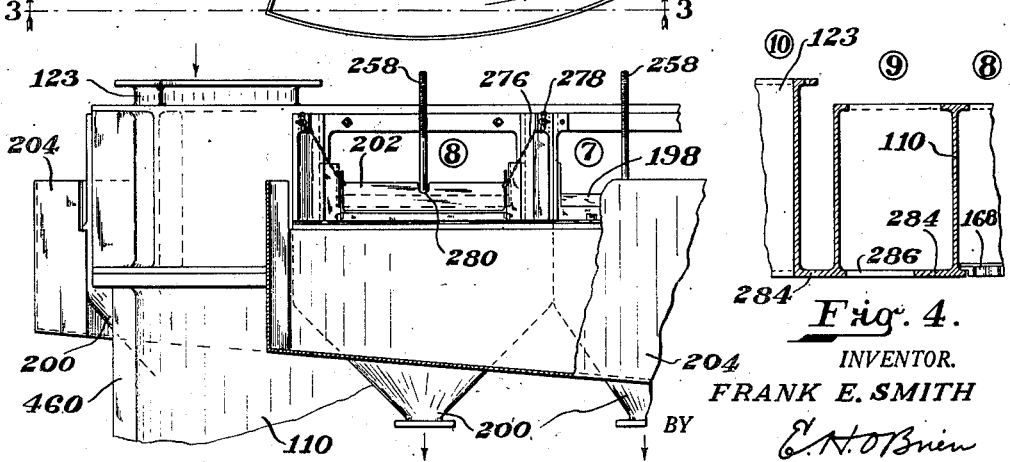

Nov. 16, 1943.   F. E. SMITH   2,334,683
SEPARATION OF MATERIALS
Filed March 10, 1941   8 Sheets-Sheet 3

INVENTOR.
FRANK E. SMITH
BY
ATTORNEY.

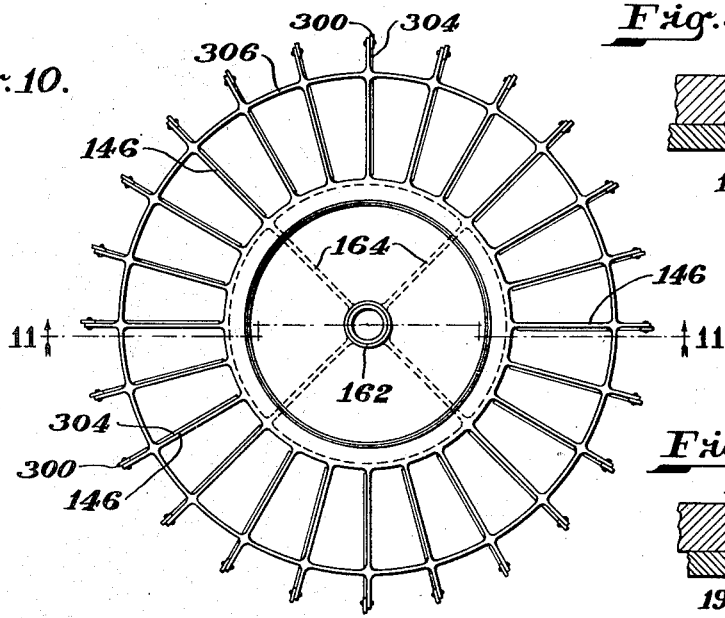
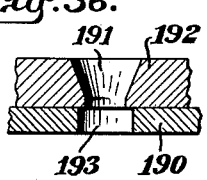
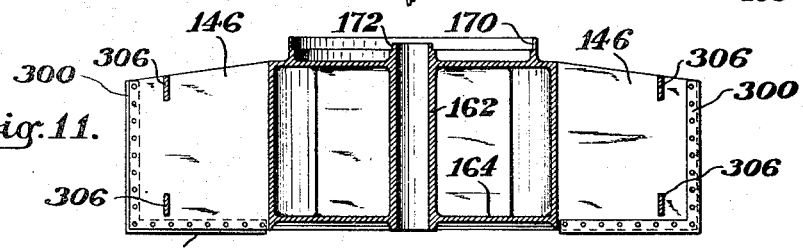
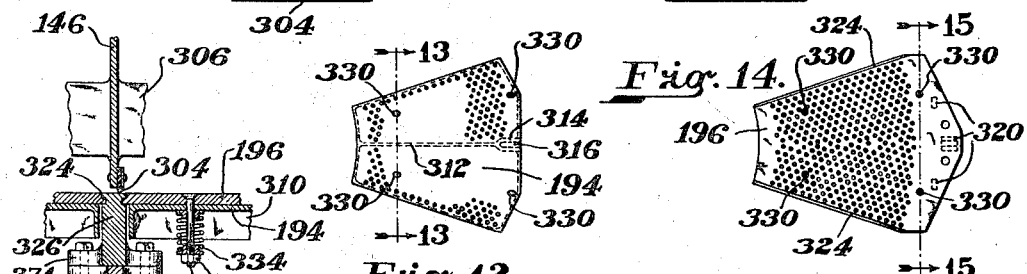
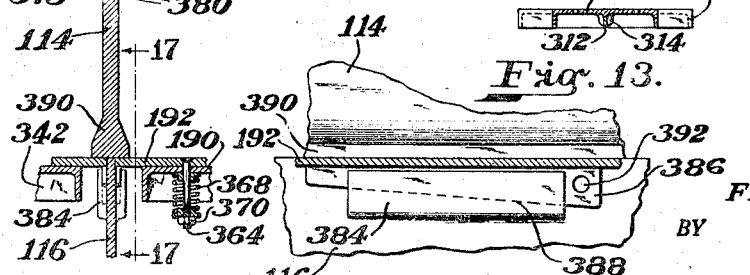
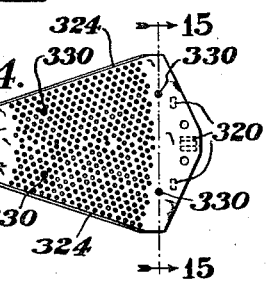
INVENTOR.
FRANK E. SMITH
BY
ATTORNEY.

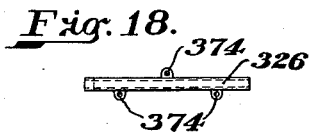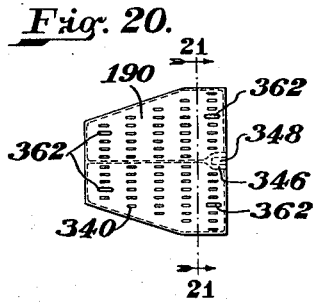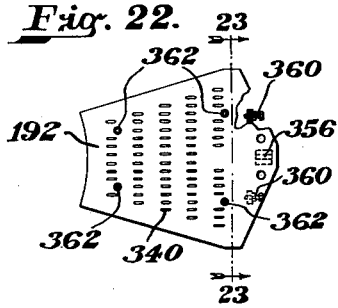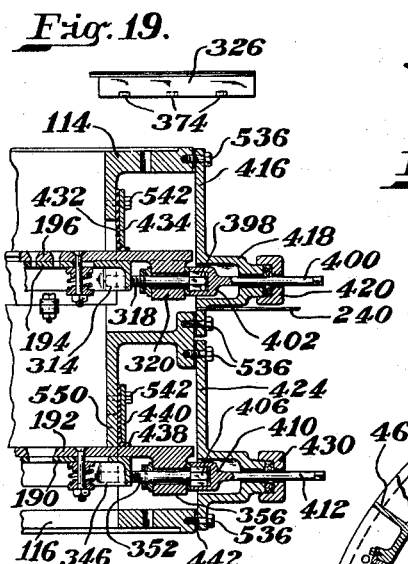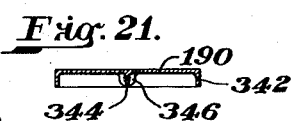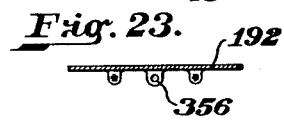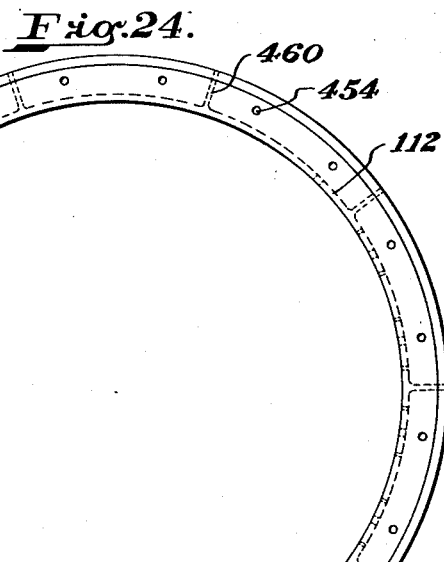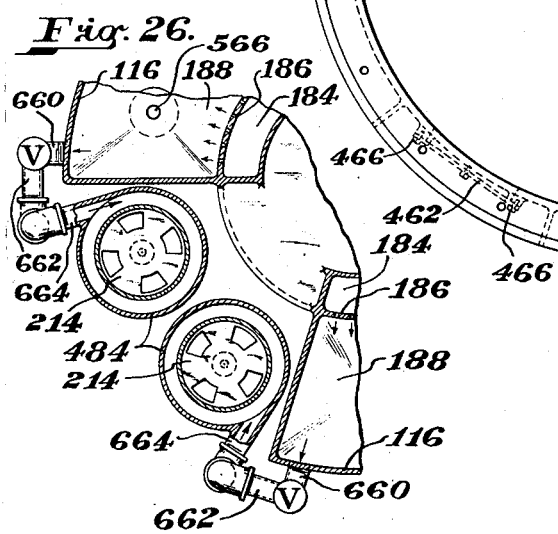
INVENTOR.
FRANK E. SMITH

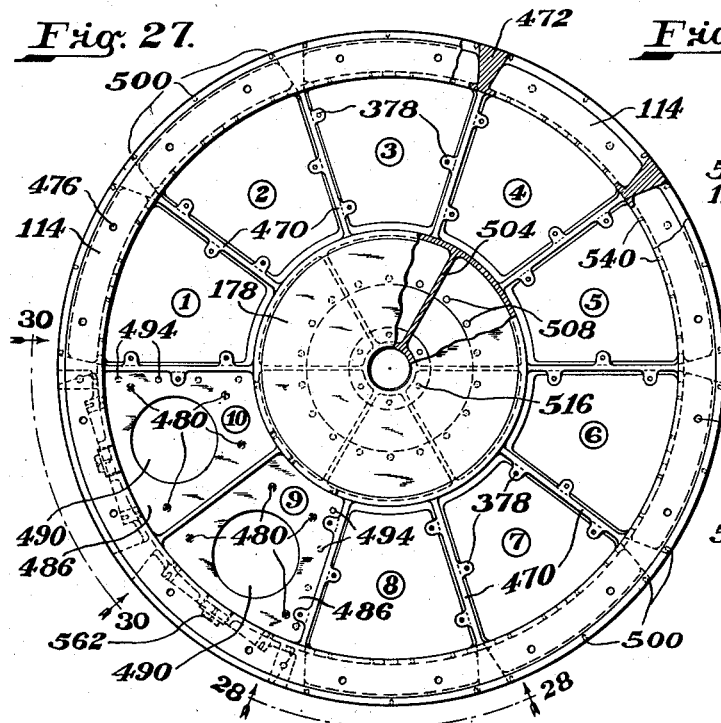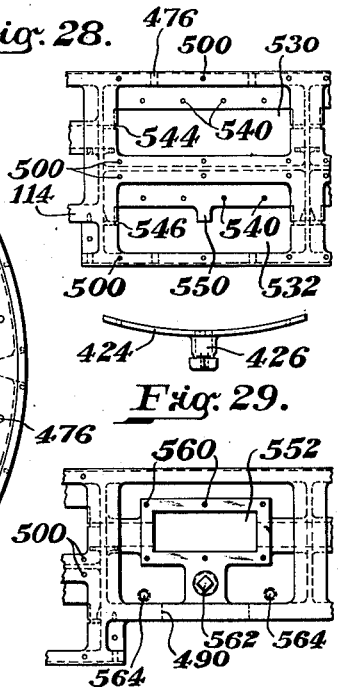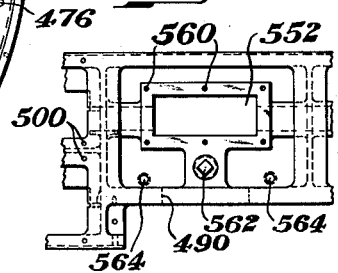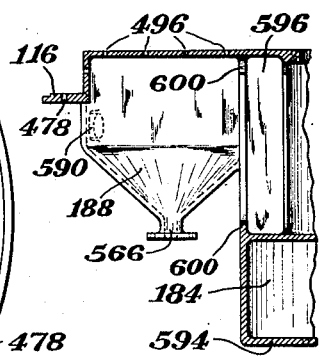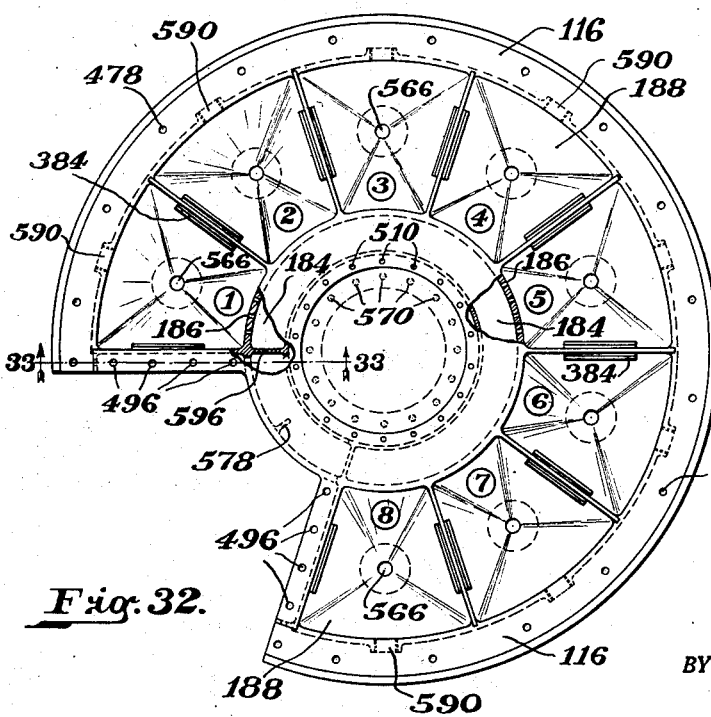

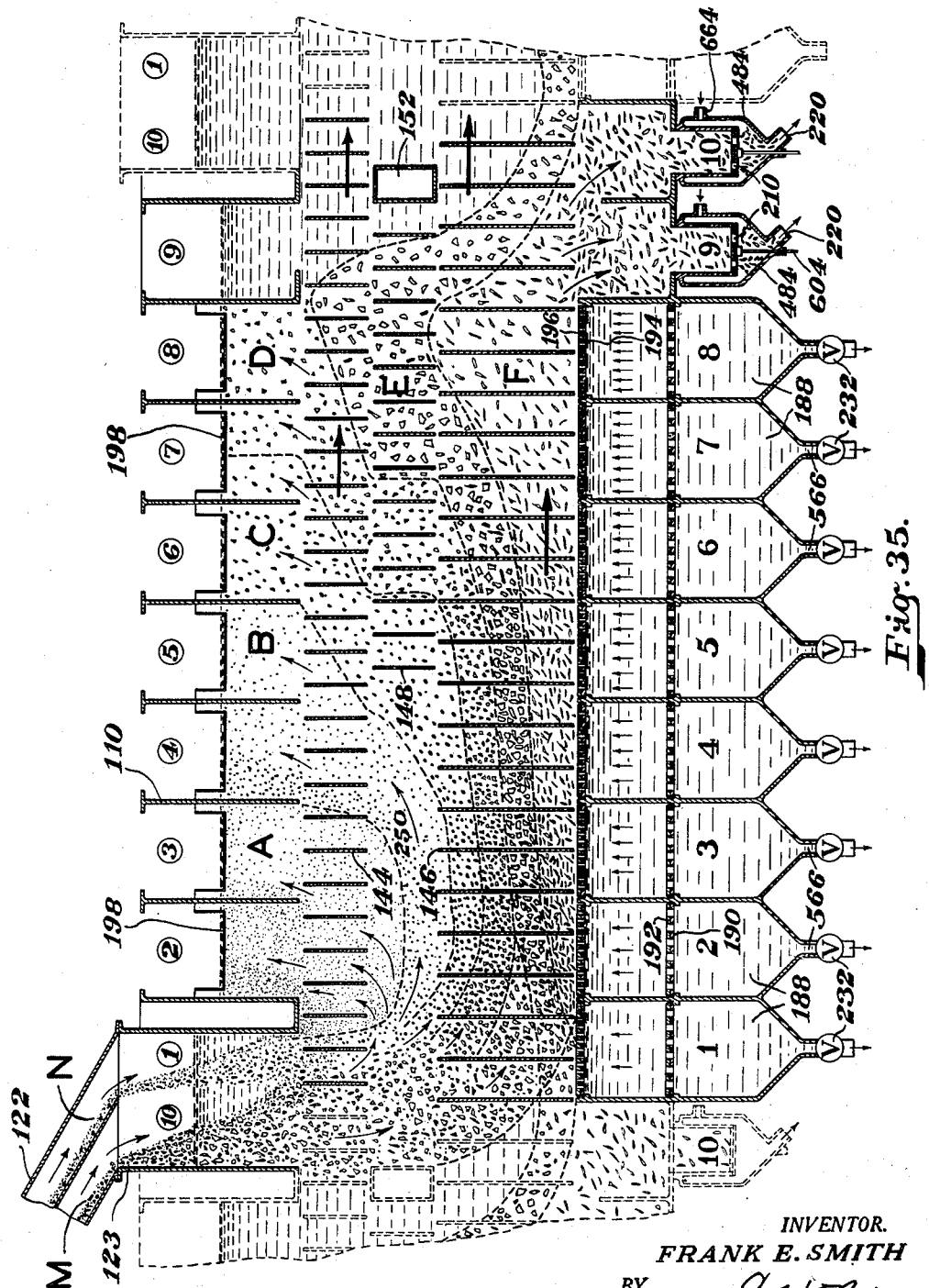

Patented Nov. 16, 1943

2,334,683

UNITED STATES PATENT OFFICE 2,334,683

SEPARATION OF MATERIALS

Frank E. Smith, Niagara Falls, N. Y., assignor to
E. I. du Pont de Nemours & Company, Wilmington, Del., a corporation of Delaware Application March 10, 1941, Serial No. 382,526

27 Claims. (Cl. 209—209)

This invention relates to the separation of materials and more particularly to a method and an apparatus for the practice thereof. The invention concerns itself with a process for the hydraulic separation of relatively small bodies that, because of differences in size, specific gravity, and/or shape, are amenable to such a separation, as well as to improved apparatus for carrying out that process.

This invention is a continuation-in-part of that disclosed in my copending patent application Serial No. 298,832, filed October 10, 1939, which latter application is, in turn, a division of my application Serial No. 144,624, filed May 25, 1937, now Patent No. 2,176,107 issued October 17, 1939.

For definiteness and not by way of restriction, the invention is described with more particular reference to its utilization in the classification of coal, such, for example, as coal in a relatively fine state of subdivision, such as the commercial rice or barley sizes. The coal is treated to separate the fractions of higher coal content from the fractions of higher slate content, which latter fractions are hereinafter referred to, for purposes of brevity, as refuse. Both process and apparatus are of course equally applicable in the separation of other solids, more particularly solids of mineral origin containing mineral values, regardless of the character or state of subdivision of these particles. In many instances where ores are separated into various fractions by hydraulic separation in accordance with my invention, the heavier particles, which are refuse when coal is being subjected to hydraulic classification, will in this instance contain the desired mineral values, the materials of lighter specific gravity being discarded as tailings.

While classification of solids by means of hydraulic currents has previously been practiced to some extent, a difficulty with apparatus for accomplishing this purpose, prior to that disclosed in my application Serial No. 144,624, now Patent 2,176,107, has been that the layer of coal difficult to classify which forms in an upward current hydraulic classifier greatly interferes with operations, reducing both the speed and efficiency of the classification process. Various efforts to overcome this difficulty had previously been made, which difficulty is for the first time solved in the apparatus disclosed in my copending applications above referred to.

Accordingly, the invention forming the subject matter of this application utilizes in general the method disclosed in those copending applications, wherein a column undergoing a separation into layers, zones or divisions to the extent desirable under the hydraulic conditions obtaining, is bodily displaced with respect to other columns so that different hydraulic conditions may be imposed, to the end that the particles present in said layer, zone, or division capable of separation under those different hydraulic conditions may be efficiently separated. In general then, the invention herein disclosed is an improvement on that shown, for example, in my issued Patent 2,176,107, but employs many features of the method described in that patent. Thus it utilizes hydraulic flows in the various hydraulic columns of gradually increasing intensity, as well as moving zoners which displace partially classified layers or zones to another hydraulic column, where the solid particles capable of separation therein may be more efficiently classified under changed hydraulic conditions.

However, as the result of an extensive study of classifying operations by means of a machine formed with transparent portions so that its operation might be accurately observed, I have reached the conclusion that certain modifications in the method and apparatus of my issued patent would result in more efficient classification. These conclusions have been substantiated by tests carried out on full-scale commercial machines. The changed conditions in the method of operation and the changes in the apparatus necessary to secure such an improved method of operation are disclosed in this application.

In my issued patent, and in my copending application, increments of solid particles of various sizes and gravity, generally the so-called lighter material, are washed over the top of the hydraulic columns and thus out of the apparatus. In that apparatus all of the heavier material or refuse was discharged in the last hydraulic columns, the machine thus being completely emptied before the rotating zoners again entered the feed column. This feature is no longer true of my improved apparatus and method of classification.

I have now found that it is possible to utilize the principle of hindered settling in an efficient manner by utilizing and controlling beds containing materials in suspension, thus forming fluid masses of relatively high density. In accordance with the method forming the subject matter of this application, the so-called lighter materials are displaced out of the apparatus at the upper portions of the separate hydraulic columns by the expansion of a bed of material under them. By thus securing displacement by expansion of a fluid mass containing solid particles therein, the lighter material may be discharged over the top of the column by utilization of a current of fluid which has a velocity approximately half that of the falling velocity of the particles taken out of the machine over the tops of the hydraulic columns. In a machine of the type utilizing my improved principles of classification, let us assume, for purposes of illustration only, that there are ten hydraulic columns, of which columns 1 and 10 are generally the feed columns, columns 2 to 8 are those in which the lighter material is displaced out of the machine at the tops of the columns, and columns 9 and 10 are provided with outlets at their lower portions for the discharge of heavy material. In accordance with the improved method of operation, a permanent bed of solids suspended in the hydraulic liquid is maintained in the machine, which bed is such that when it is expanded in column 8, will reach to but not over the No. 8 outlet for lighter material at the top of the column. This means that all material lighter than this permanent bed will have been forced out of the apparatus at the outlets in columns 2 to 8. By providing a permanent bed of refuse material within the machine I am enabled to effect more efficient classification, utilizing principles of hindered settling, at lower velocities of hydraulic flow than is possible in the machines disclosed in my above-referred-to patent applications.

If a sufficient permanent bed of material is continuously present within the machine during operation, all excess heavy material or refuse coming in with the feed will be discharged from the apparatus at the bottoms of hydraulic columns 9 and 10, in the typical machine that has been previously referred to. However, if the feed varies so that a small amount or no refuse or heavy particles of the type forming the permanent bed is supplied to the apparatus, it is then necessary that a portion of this incoming refuse or heavy material be retained in the machine. This permanent or recirculated bed therefore supplies a high density fluid mass, expanded from column 1 to column 8 by the difference in intensity of the hydraulic streams as it is laterally transported by the rotating zoners, through which fluid mass lighter particles will not sink but will be forced by the expansion out of the machine at the tops of the hydraulic columns.

The method of operation will be hereinafter described in detail, and these characteristics are at this time pointed out merely for the purpose of illustrating how the method differs from that utilized in the apparatus described in my earlier applications.

The mechanical changes in the machine, as compared with those described in my earlier applications, in order to secure this improved method of operation, may at this time be briefly pointed out.

I have found it advisable to provide a stationary zoner which extends part way around the apparatus. In the construction herein described the stationary zoner extends through columns 5 to 9 inclusive, but parts of the zoner blades are omitted in columns 10, 1, 2, 3, and 4, so that the middle space is unobstructed in these columns. When the feed material to be classified is supplied to the machine, generally at hydraulic columns Nos. 10 and 1, the material in the feed column is practically clear water. If, for example, 45 cubic feet of feed material enters at this point it is obvious that 45 cubic feet of water will be displaced. If provision is not made for removal of this water, it flows backwardly as well as forwardly at high velocities through restricted openings, thus interfering with the process and destroying accurate control of the machine's operation. One of the functions of these stationary zoners is to prevent horizontal movement of the displaced water. The flow of water is thus distributed over the earlier hydraulic columns, columns 1 to 4 inclusive in the typical machine herein described, and utilized as part of the upward classifying current serving to carry solid material of smaller sizes out of the machine. It is evident that in these earlier hydraulic columns the operation is strictly a hydraulic classification, as contrasted with removal of lighter material by displacement of a permanent bed of high fluid density such as takes place in later columns.

Another distinction in my improved apparatus is that the refuse outlets are now controllable so that a certain amount of the refuse may be permanently maintained within the machine at all times to provide the fluid mass of high density. This control is effective in two ways. In the discharge outlets at the bottom of the hydraulic columns 9 and 10 wherein discharge of refuse material takes place there are provided valves formed of flexible materials, the valve openings of which can be regulated as desired. In addition there is provided a valve in each of these columns which valve is automatically opened or closed in response to changes in density occurring within one or more of the hydraulic columns. This operation occurs automatically, the valve openings being opened or closed automatically by means of pressure responsive means in a manner which will be more fully described hereinafter.

Moreover, the new construction utilizes fixed orifice plates in place of the swinging bottoms of the bottom zoner members, which formed a part of the construction disclosed in my issued patent. The upward currents of water or other classifying liquid are distributed evenly over the entire area by means of certain valve plates and certain orifice plates which are permanently fixed in position. These fixed orifice plates constitute the counterpart of the swinging bottoms of the lowermost zoners of the former construction as shown in my issued patent.

Among the objects of this invention is the development of an improved type of classifier apparatus, employing an improved method of classification, wherein both ordinary hydraulic classification and hindered settling in a fluid mass of relatively high density are utilized in the classification. This object may be expressed in another way by stating that my invention is concerned with the utilization of the principles of hindered settling, employing fluid masses of relatively high density containing solid materials in suspension, to displace lighter material out of the apparatus at the upper portions of the hydraulic columns, this displacement being brought about by expansion of the permanent or recirculated high density bed.

Another object of this invention is the development of certain new and improved apparatus for utilizing on a commercial scale this improved method of hydraulic classification. This latter object is satisfied by the utilization, in general, of a type of apparatus similar in many respects to that shown in my issued patent, which apparatus has been improved, however, in a number of particulars essential to permit operation of the classifier in accordance with my improved method of classification.

Still another object of this invention is the automatic regulation of the discharge of the heavy material or refuse from the bottoms of certain of the hydraulic columns, the automatic discharge being so designed as to maintain a permanent bed of high fluid density in the apparatus. This object is attained by utilizing a new method of automatic control wherein certain valve openings discharging the refuse are controlled in relation to variations in density occurring in certain of the hydraulic columns. In the attainment of this object I employ certain new apparatus and certain control mechanism applied for the first time to a hydraulic classifier of this general type.

Still another object of this invention is the improvement of the zoner construction, as compared with the zoners forming part of the apparatus disclosed in my issued patent. In this improved zoner construction, not only are the bottoms of the lowermost zoners left open, but there are provided intermediate the upper and lower zoner members a stationary zoner element serving the functions previously set forth. Moreover, these zoner elements are supported and operated in a novel and improved manner.

Other objects of this invention include the improvement of various features of the apparatus, such as the upper weir members and the provision of orifice and valve plates. The water or other liquid utilized in the classification is now supplied from a central source or reservoir, which itself forms a part of the casting of the classifier machine.

The above objects, as well as other objects which will hereafter become apparent, may be accomplished with the apparatus illustrated in the accompanying drawings. Without restricting my invention to such apparatus, it is described with more particular reference to these drawings, wherein:

Fig. 1 is a cross-sectional view, some parts being illustrated in elevation, of the entire hydraulic classifier apparatus taken substantially on the line 1—1 of Fig. 2, looking in the direction of the arrows. It will be noted from Fig. 2 that this cross-sectional view is taken through hydraulic column 10 on the left of the central axis and through hydraulic column 6 on the right of the central axis, which columns are typical of the two types of hydraulic columns comprising the apparatus. It may here be noted that throughout the drawings the individual hydraulic columns are numbered from 1 to 10, these numbers being in a circle to indicate that they apply to the hydraulic columns. While the apparatus is shown as comprising ten individual hydraulic columns, it is of course obvious that fewer columns could be utilized or more columns utilized, as desired, without departing from the principles of my invention.

Fig. 2 is a plan view of the upper casting of the classifier, some portions of the apparatus being omitted for clarity. This view shows the weir regulating apparatus and the launder for conveying liquid removed by the scraper blade to a single discharge outlet. The omitted portions are in hydraulic columns Nos. 6, 7, and 8. In column 6 part of the upper casting and scraper blade are cut away. In column 7 the scraper blade and hand wheel for regulating the elevation of the weir are removed. In column 8 only the hand wheel for regulating the elevation of the weir is removed. The hopper feeding material to be classified to hydraulic columns 1 and 10 is removed. It may be noted that this view actually constitutes a plan view of the entire machine, omitting the driving motor and operating mechanism shown at the upper portion of Fig. 1, since it shows the top portions of the hydraulic columns, some of which contain baffle members, as well as the scraper blades and weir-operating mechanism.

Fig. 3 is a cross-sectional view, some parts being shown in elevation, taken substantially on the line 3—3 of Fig. 2. In this view part of the launder is cut away to show the upper portions of hydraulic columns Nos. 7 and 8. In hydraulic column 7, as in Fig. 2, the hand wheel and scraper blade are removed, while in column 8 only the hand wheel is removed.

Fig. 4 is a cross-sectional view of the upper portion of the casting taken substantially on the line 4—4 of Fig. 2. This view shows the construction of the casting, including shoes or partial closure members which serve to constrict the opening in the upper portions of hydraulic columns Nos. 9 and 10 for purposes subsequently to be described. In addition, and for purposes of comparison, a portion of the upper part of the casting adjacent hydraulic column 8 showing the baffle in that column is illustrated.

Fig. 10 is a plan view of the lower zoner. Fig. 11 is a vertical cross-sectional view of this zoner taken substantially on the line 11—11 of Fig. 10.

Fig. 12 is a plan view of a lower orifice plate. Fig. 13 is a cross-sectional view of this lower orifice plate taken substantially on the line 13—13 of Fig. 12.

Fig. 14 is a plan view of an upper orifice plate. Fig. 15 is a cross-sectional view of this upper orifice plate taken substantially on the line 15—15 of Fig. 14.

Figure 1:
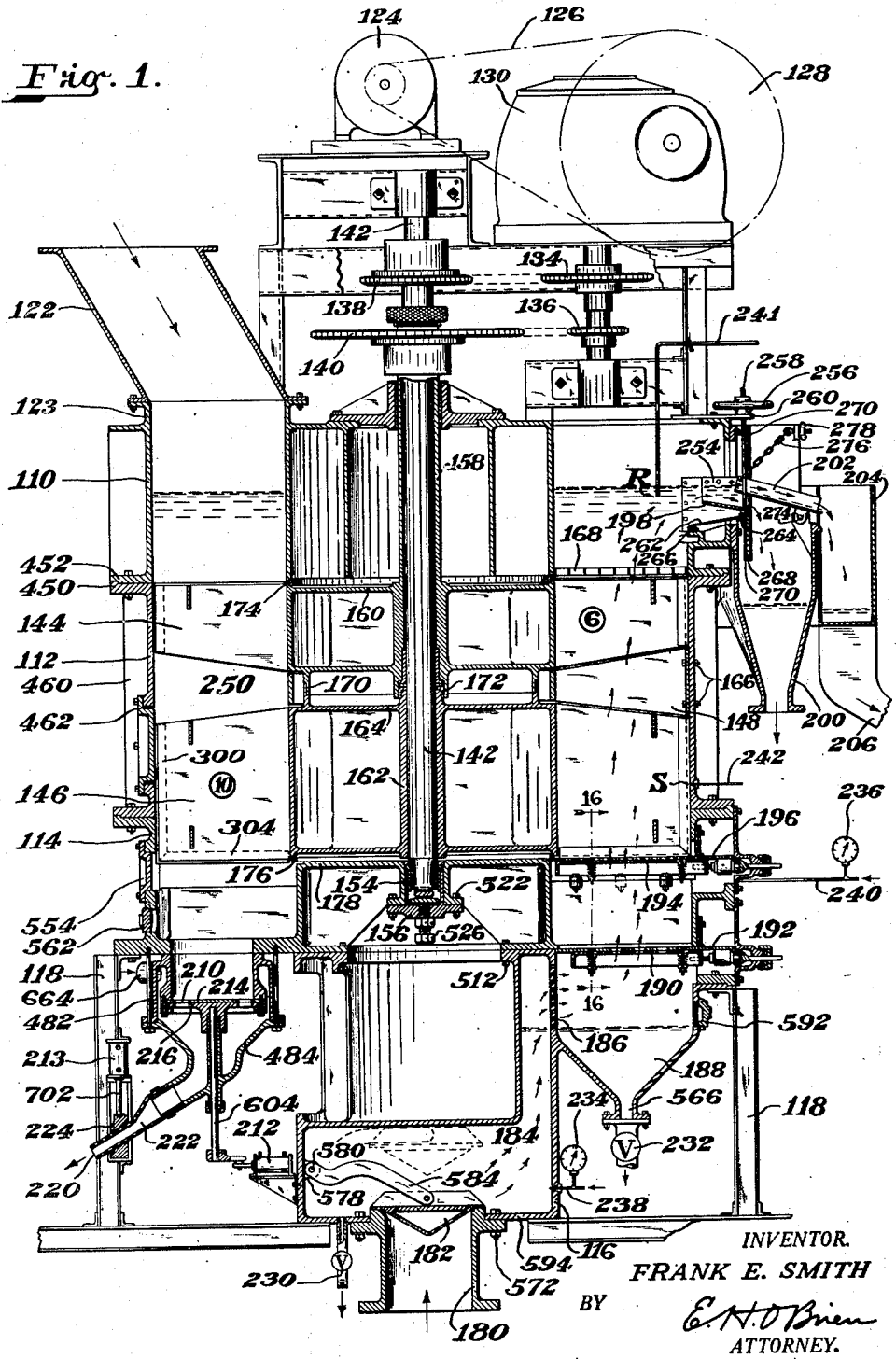

Fig. 16 is a view in detail, showing the manner in which upper and lower orifice plates and upper and lower valve plates are supported from the lower casting and the supporting wall of the lowermost or reservoir casting. Fig. 17 is a cross-sectional view, some parts being shown in elevation, taken along the line 17—17 of Fig. 16. It shows the wedging means, seated in a clevis provided for the wedge, for rigidly pressing the upper valve plate against the lower abutment of the lower casting wall.

Fig. 18 is a plan view of a guide for the upper orifice plate. Fig. 19 is an elevational view of the same guide member.

Fig. 20 is a plan view of a lower valve plate. Fig. 21 is a cross-sectional view taken along the line 21—21 of Fig. 20 of the same valve plate.

Fig. 22 is a plan view of an upper valve plate, part of this valve plate being broken away to show one of the adjusting or setting bolts seated in a threaded ear on the lower side of the valve plate. Fig. 23 is a cross-sectional view of the same valve plate, taken substantially on the line 23—23 of Fig. 22.

Fig. 24 is a plan view of the casting comprising the shell member of the hydraulic classifier. The shell forms the central part of the housing, between the upper casting member and the lower casting member, in which shell are positioned for operation the three sets of zoner members.

Fig. 25 is a view in detail showing the adjusting means by which the lower orifice plate is adjusted with respect to the upper orifice plate, and the lower valve plate is adjusted with respect to the upper valve plate. This view also shows part of the lower casting member and the auxiliary housing members which serve to house the adjusting mechanism. As will be more fully explained hereinafter, and as illustrated in Figs. 36 and 37, by changing the position of a lower orifice plate with respect to its corresponding orifice plate, or the position of a lower valve plate with respect to its corresponding valve plate, the openings between these sets of plates may be increased or restricted, as desired. These pairs of members constitute valves, the openings therebetween constituting the valve openings.

Fig. 26 is a cross-sectional view, some parts being illustrated in plan, showing a part of the lower casting and the discharge spigots through which the heavier material is discharged from the hydraulic classifier. This heavier material may of course be refuse, or it may contain desired mineral values.

Fig. 27 is a plan view of the lower casting. Fig. 28 is a typical elevation of this lower casting, this view being taken on the line 28—28 of Fig. 27.

Fig. 29 is a view in detail of a typical cover plate and gland used in connection with the lower casting to provide a housing for the members for adjusting the valve plates and the orifice plates. Two of these cover plates are illustrated in cross-section in Fig. 25.

Fig. 30 is an elevational view taken substantially on the line 30—30 of Fig. 27. This view shows part of that portion of the casting as it is constructed adjacent hydraulic columns 9 and 10, showing the frame for the clean-out door which is located above the discharge outlets from these columns. Fig. 31 is a detailed view of a clean-out door adapted to fit in the opening shown in Fig. 30.

Fig. 32 is a plan view of the reservoir casting showing the sedimentation hoppers at the bottom of hydraulic columns 1 to 8 inclusive. This view also shows the clevis members seating the wedge members shown in Figs. 16 and 17. Certain portions of this figure are cut away in order to show the perforated side wall of the casting through which the stream of water or other hydraulic fluid flows on its way from the inlet chamber to the bottoms of hydraulic columns 1 to 8 inclusive.

Fig. 33 is a cross-sectional view taken substantially on the line 33—33 of Fig. 32. It shows the lower part of the reservoir casting, particularly that portion which forms the chamber through which the stream of water or other hydraulic liquid flows on its way to the hydraulic columns. This view also shows, in elevation, a typical sedimentation hopper, as these hoppers are positioned at the bottoms of hydraulic columns 1 to 8 inclusive.

Figure 34:
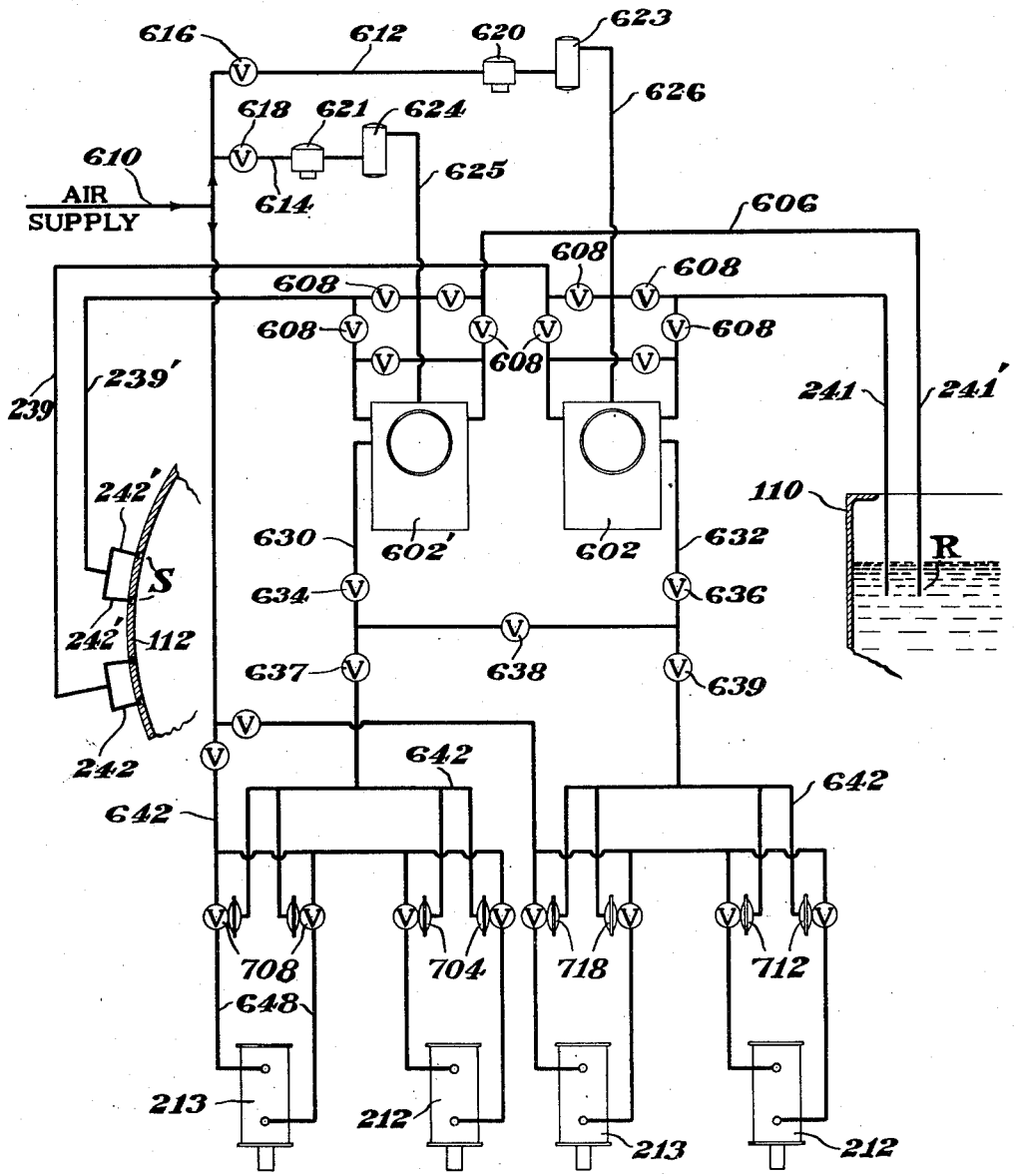

Fig. 34 is a schematic view showing the mechanism by which the operation of the discharge openings positioned at the bottom of hydraulic columns Nos. 9 and 10, serving to control the discharge of heavy material, is controlled by variations in hydraulic pressure within the classifier.

Fig. 35 is a developed section showing the ten hydraulic columns stretched out in linear arrangement instead of as sectors of the cylindrical hydraulic classifier. This generally schematic view is designed to illustrate in a diagrammatical manner the method of operation of the classifier. It shows the permanent recirculated bed of refuse material, E, which permits utilization in the method of classification of the principles of hindered settling.

Fig. 36 is a view in detail showing the construction of the openings in valve and orifice plates. The openings in each of these sets of plates are essentially the same, except for a difference in shape, which will be more fully pointed out hereinafter. Therefore this figure may be regarded as either a cross-sectional view of the orifice plates or of the valve plates. Fig. 37 shows the same sets of plates with the valve openings therebetween considerably reduced. Fig. 36 shows the valve essentially in its wide-open condition, while Fig. 37 shows the valve almost completely closed.

GENERAL ARRANGEMENT

Referring particularly to the drawings, with particular reference to Figs. 1, 2, and 35, the general arrangement of the improved classifier apparatus will be described. Exact details of the construction of the individual parts of the apparatus will be undertaken subsequently.

As shown perhaps best by Fig. 35, the classifier consists generally of a number of hydraulic columns, which number depends entirely on the design of the apparatus. As illustrated as typical of my invention, the apparatus includes ten hydraulic columns. These hydraulic columns are numbered respectively 1 to 10, and in hydraulic columns Nos. 1 to 8 inclusive there are provided streams of water or of other hydraulic liquid which enters at the bottom of the columns and serves to classify the solids in the columns by the application of hydraulic principles.

The housing for the apparatus consists generally of three castings, upper casting 110, shell 112, and lower casting 114. In addition, the entire apparatus rests on the lowermost casting, the reservoir casting 116. This reservoir casting, to which the three upper members comprising the housing are rigidly secured, may be supported by columns 118 from the floor or other supporting structure. As shown in Fig. 32, the reservoir casting is cut away adjacent columns 9 and 10, and at these parts the columns 118 (see the left-hand end of Fig. 1) extend up to and support the lower casting member.

Bolted or otherwise securely fastened to the upper part of the upper casting 110 is the hopper 122 through which the solid material to be classified is introduced into the classifier apparatus. As shown in Fig. 35, this may be introduced to either column 10 or column 1, or to both hydraulic columns.

Power for rotating the upper and lower zoner members is supplied by motor 124, which through belt 126 and pulley 128 is operatively connected with the speed-reducing gears 130. The speed reducer serves to operate sprocket wheels 134 and 136 at reduced speed. Sprocket wheel 134 is operatively connected with sprocket wheel 138, while sprocket wheel 136 is operatively connected with sprocket wheel 140. Wheels 138 and 140 are positioned on the central shaft 142 (wheel 140 being operatively connected to a sleeve 158 on the shaft) and serve to rotate upper zoner members 144 and lower zoner members 146 in a manner subsequently to be described. It may here be noted that these zoners are adapted to be rotated at different speeds.

Figure 7:
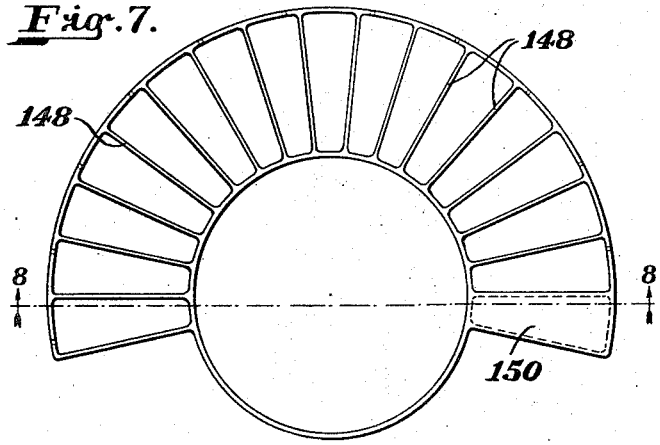
Fig. 7 is a plan view of the stationary or central zoner member.
Figure 8:
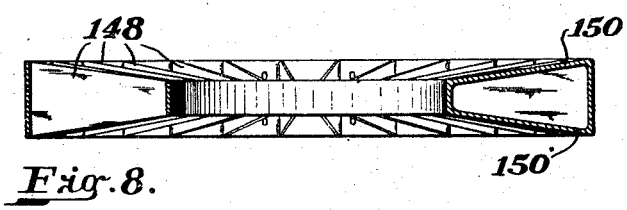
Fig. 8 is a vertical cross-sectional view of the stationary zoner member taken substantially on the line 8—8 of Fig. 7.

In each hydraulic column there may be at any moment several of the upper zoner elements 144 and several of the lower zoner elements 146. In addition, there are the stationary zoners 148, shown in detail in Figs. 7 and 8. As shown in these figures, and in Fig. 35, the stationary zoners extend from hydraulic columns 5 through 9 inclusive. Between the last two of these stationary zoner members, as shown in Figs. 7 and 8, there are provided upper and lower closure plates 150, so that the space between these zoner plates is actually completely enclosed. This construction is also shown by the numeral 152 in the schematic view, Fig. 35, and serves an important function in the operation of the mechanism, as will subsequently be described.

The shaft 142 is provided with a stepped bearing indicated generally by the numeral 154, which stepped bearing seats in a portion of the lower casting covered by cover plate 156. Access to this cover plate for the purpose of adjusting the bearing may be had through the reservoir casting 116, since the portions of this casting adjacent hydraulic columns 9 and 10 do not extend as far downwardly as they do at the other hydraulic columns. This is perhaps more clearly shown in Fig. 32.

Around shaft 142 is a sleeve 158, which sleeve is in operative connection with the spider members 160 supporting the upper zoner members 144. This sleeve 158, as shown, is driven from sprocket 140, which in turn is operated from sprocket 136. The shaft itself is rotated from sprocket 138, which is operatively connected with sprocket 134 rotated from the speed-reducer 130. It is thus apparent that the shaft 142 may be rotated at one speed, while the sleeve 158 may be rotated at a speed different from that of the shaft.

Shaft 142 is keyed at its lower portion to hub 162, to which portion are attached the spider members 164 for supporting the lower zoner members 146. Thus the lower zoner members and upper zoner members may be rotated at speeds different from each other.

Stationary zoner members 148 are rigidly supported from the shell 112 by supporting bolts 166. There is positioned at 172 a bearing between sleeve 158 and hub 162. It is evident that this bearing permits one of these members to move with respect to the other, thereby permitting the sleeve 158 and hub 162 to be rotated at different rotational speeds.

Figure 9:
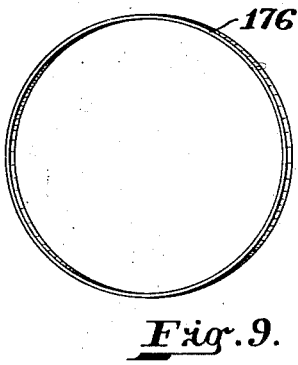
Fig. 9 is a perspective view of a seal ring, two of which seal rings are positioned in the casting of the hydraulic classifier, one ring being located at the upper edge of the upper zoner member, while the other ring is positioned adjacent the lower edge of the lower zoner member.

There is also provided the seal 170 between spiders 160 and 164, supporting zoners 144 and 146 respectively. A seal ring, 174, is positioned between upper casting 110 and upper zoner 144. A similar seal ring 176 is positioned between the spider 164 supporting lower zoner 146 and the upper orifice plate 196. Fig. 9 is a perspective view of a seal ring.

A stream of water or other hydraulic liquid enters, as shown by the lowermost arrow in Fig. 1, into the inlet pipe 180. In passing upwardly under pressure it displaces the pivoted float valve 182 supported for pivoting on arm 584, and flows upwardly through the reservoir 184 provided in the reservoir casting 116. The direction of flow is indicated by the arrows in Fig. 1. This stream of water passes through the perforated section 186 of the reservoir casting into the portion 188 of the hydraulic columns below the valve and orifice plates. As shown in Fig. 35, water is supplied in this way only to the base of columns 1 to 8 inclusive, and as shown by the arrows in these columns in Fig. 35, the velocities of the streams of water supplied to columns 1 to 8 may progressively increase.

The stream of water entering space 188 at the base of columns 1 to 8 inclusive passes upwardly in the space between the lower valve plate 190 and the upper valve plate 192. It then passes upwardly through the openings provided between lower orifice plate 194 and upper orifice plate 196 into the hydraulic columns. Material displaced in these hydraulic columns is carried upwardly as shown by the arrows in column 6 of Fig. 1 through the baffle member 168 and out over weir 198 at the top of the hydraulic column. These weirs 198, at the top of each hydraulic column, may be adjusted to various elevations, as desired, as will subsequently be more fully described in detail. After passing out over the weir 198 the material is discharged from the apparatus through the discharge outlet 200. As shown in Fig. 1, scraper blade 102 removes excess liquid from the suspension of solids in liquids going over weir 198. As the solids will tend to pass very close to the lip of weir 198, the supernatant stream of water may be withdrawn by scraper 202 to channel or launder 204. This liquid then flows around to outlet 206, where it is discharged from the apparatus. In this way the load on the dewatering screens to which the solid material is discharged through outlet 200 is reduced.

As previously explained and as shown best perhaps in Fig. 35, in columns 9 and 10 no solid material is removed by flotation over weirs at the top of the hydraulic column; these columns serving for the discharge of heavy material through specially provided spigots at the base thereof. There are therefore no weirs 198 or baffles 254 in these hydraulic columns. As shown generally in Fig. 1, these discharge outlets comprise valve members generally indicated by the numeral 210 which are operated by operating cylinder 212 in a manner subsequently to be described. It will be noted that valve 210 comprises two plates, an upper plate 214 and a lower plate 216, the opening therebetween constituting the valve opening. The heavy material passing down through the valve opening between plates 214 and 216, the size of which valve opening is controlled, as subsequently to be described, from operating cylinder 212, flows out of the apparatus through outlet 220. This outlet is in a flexible discharge member 222 formed of rubber or other flexible material, and the size of the orifice from this flexible member is controlled by clamping member 224 positioned around the flexible rubber outlet.

Valve 230 is provided for draining the apparatus through the reservoir 184 at the conclusion of operations. At the bottom of each hydraulic column in columns 1 to 8 inclusive there is provided a drainage valve 232 through which sediment may be removed from the columns. As previously stated, hydraulic columns 9 and 10, which discharge heavy material at the bases thereof, are provided with the previously described valved control outlets and flexible members 222, shown perhaps best in schematic view Fig. 35.

A gauge 234 indicates the pressure within the reservoir chamber 184. Similarly, a gauge 236 indicates the pressure of the hydraulic fluid at that portion of the apparatus between the valve plates 190, 192, and the orifice plates 194, 196. These gauges are in lines 238 and 240 and, as shown by the arrows, pneumatic pressure may be supplied to the apparatus through these conduits. Conduit 241 and conduit 242, together constitute conduits by which the discharge of solid material through the valves 210 in columns 9 and 10 is controlled by the "Fulscope" mechanism illustrated schematically in Fig. 34.

GENERAL OPERATION

Having thus described in a general way the parts comprising the classifier apparatus, some general description may advantageously be given of its mode of operation. In general this device operates in accordance with the principles described and claimed in my Patent 2,176,107, issued October 17, 1939. In describing the general mode of operation, leaving aside specific features of the process which will be described subsequently in greater detail, particular attention will be paid to Figs. 1 and 35.

The material which is to be classified by the application of hydraulic principles, which may be coal or other mineral product, is introduced into the apparatus through the hopper 122. Selecting coal merely for purposes of illustration, the coal of barley or rice size is fed in through this hopper. The object of the classification is to separate coal particles from slate particles, particles intermediate between slate and coal being separated into various fractions of different gravity which pass out of the apparatus at the tops of hydraulic columns 2 to 8 inclusive over weirs 198. As shown in Fig. 35, where materials of two different sizes such as coal of rice and barley size are to be classified at the same time, the material may be fed in at two different points in the apparatus, one point M being for rice feed, while the second point N is for barley.

After being fed in at the top of hydraulic columns 1 and 10, the material to be classified drops downwardly through the feed hopper and is subjected to an initial or primary classification in column 1. It then drops through the space traversed by the upper zoner members 144 into the space 250, where the stationary zoners 148 have been omitted. Continuing to drop, the material comes into contact with the moving lower zoner members 146, by the blades of which it is displaced around the machine. As the material is moved from column to column it comes into contact with the hydraulic streams in the various hydraulic columns, these streams being of gradually increasing intensity, as shown by the upward arrows in hydraulic columns 1 to 8 inclusive of Fig. 35. While the upper zoner member 144 is also moving, because of its relatively slow rotational speed the material fed in at columns 10 and 1 readily drops through the upper zoner members in columns 10 and 1 until it comes in contact with the more rapidly moving lower zoner members, by which it is positively displaced through the apparatus.

There are thus developed by the classification occurring in each column, the material being spread out and displaced throughout the apparatus by the moving upper and lower zoners, layers or beds of classified materials of various generally uniform sizes. These classified layers are indicated by varying the particle size shown in the schematic drawings, Fig. 35. They may for convenience be termed "classified layers," and are designated by the letters A, B, C, D, E, and F. Fractions A to D inclusive are the lighter classified material which leaves the apparatus at the upper portion of the hydraulic columns over the weirs 198. Fractions A, B, C and D are fractions of increasing apparent density, while the heavier fraction E constitutes a recirculated bed or layer in the machine which is displaced neither with the "floats" A to D, inclusive, nor with the "sinks" F. The heavier particles, in the case of coal the shale-like materials or refuse, are removed at columns 9 and 10 through the discharge valves 210 and outlets 220, this layer being designated by the letter F. Valves 210 in each of these hydraulic columns are controlled automatically in accordance with the density conditions prevailing in the apparatus, as will be more fully explained hereinafter. In this way the amount of heavier material taken from the bottom of columns 9 and 10 may be automatically regulated. The lighter classified materials issuing over the weirs 198 in columns 2 to 8 inclusive are classified fractions of different apparent gravities.

DETAILED CONSTRUCTION OF VARIOUS PARTS OF THE APPARATUS

Having thus described the general construction of the apparatus, and the general method of operation, I now describe the construction of the various elements comprising the entire classifier assembly. In describing this construction the detail views Figs. 3 to 33 inclusive will be generally referred to.

1. Weir and scraper blade construction

Referring first to Figs. 1, 2, and 3, it should be noted that Fig. 2 shows in plan the manner in which the weirs 198 and scraper blades or skimmers 202 are arranged at the top of each hydraulic column 2 to 8 inclusive.

The weir 198 is formed by a sheet metal member 254, one portion of which is bent over at the end to form the weir. The elevation of the weir is controlled by operation of hand wheel 256, which draws operating rod 258, to which the weir plate is attached, upwardly or downwardly through the supporting member or frame 260. As the rod 258 is drawn upwardly the weir 198 is elevated; as the rod 258 is lowered, the weir is lowered. The portion of the metal plate 254 comprising the weir is rigidly secured to a flexible rubber member 262 by bolts 264. The other end of this flexible member 262 is rigidly bolted at 266 to the upper casting.

As shown in Fig. 1, the lower portion 268 of the metal plate 254 comprising the weir is adapted to travel in two guide members indicated by the numerals 270. It is obvious that the flange 268 sliding upwardly or downwardly in the guides 270 adjusts the height of that portion of the plate 198 comprising the weir. The flexible rubber member 262 permits this adjustment at will. The adjustment is effected by means of hand wheel 256, which raises or lowers the rod 258 journaled in the frame 260.

Scraper blade or skimmer 202 comprises a bent-over channel member which is pivoted at 274 and is supported by chains 276. The construction of this member is shown in elevation in Fig. 3 at column 8, which figure also shows the weir 198 in column 7; as previously explained, the channel 204 has been removed for purposes of clarity in the latter column. Chains 276 are supported by bolts 278 attached to the upper casting. The scraper 202 serves to remove the supernatant water which flows into channel or launder 204. The water or other hydraulic fluid carrying the floats leaves through discharge outlets 200, one of which discharge outlets is shown in plan view at column 7 in Fig. 2.

It is obvious that each column has its own scraper blade or skimmer and weir, together with the supporting and adjusting means, but one of these having been described as typical.

2. Construction of upper casting adjacent tops of columns 1, 9, and 10

This construction is best shown in detailed view Fig. 4, taken in connection with the schematic drawings Fig. 35. As shown, the entrance into the upper casting 110 is constricted adjacent columns 1, 9 and 10 by plate or shoe portions 284, which restrict the opening 286 into the top of the casting. Fig. 4 shows only restricting plates or shoes 284 of columns 9 and 10, but, as shown in Fig. 35, the constriction adjacent column 1 is similar. For purposes of comparison part of the upper portion of column 8 is shown in Fig. 4, in which column there is provided baffle member 168. As shown in Fig. 2, each of the columns 2 to 8 inclusive has such a baffle member through which the hydraulic fluid containing the suspended solid particles travels on its way to the discharge weirs 198. Columns 1, 9 and 10 have no baffle members, but are provided with the restricting plates 284 formed as a part of the upper casting member 110.

The restricting plates or shoes 284 serve to restrict the cross-sectional area of the open hydraulic passages extending through the columns. In this way lateral movement of solid material by passage through the machine over the top of the zoner blades 144 is prevented or restricted. The baffles 168 in columns 1 to 8 serve a like function, although, of course, they must be partially open for the passage of solid material upwardly through them.

3. The construction of the upper zoner member

Figure 5:
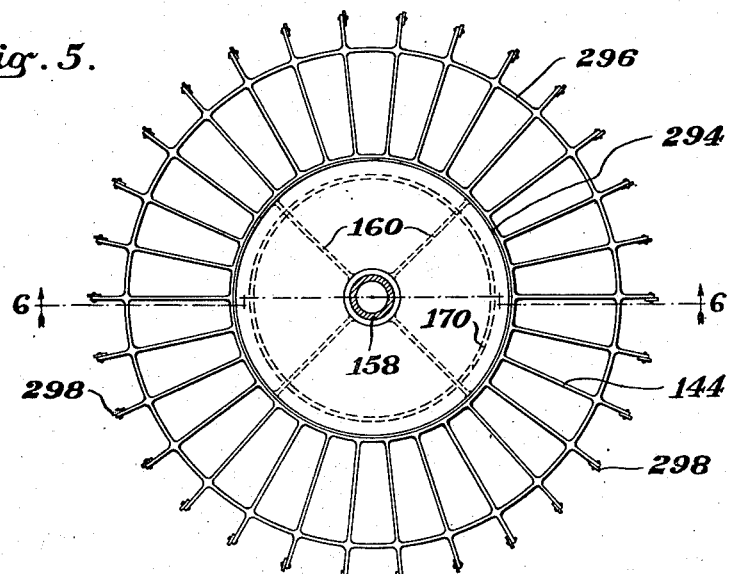
Fig. 5 is a plan view of the upper zoner member.
Figure 6:
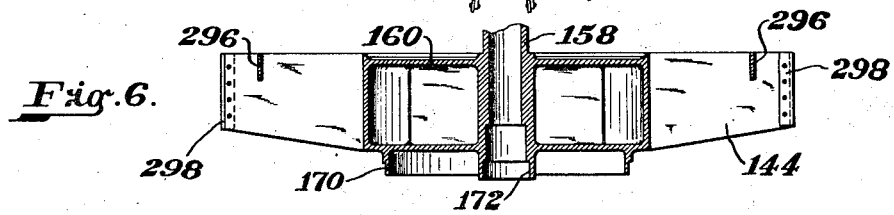
Fig. 6 is a cross-sectional view of this zoner member taken substantially on the line 6—6 of Fig. 5.

Figs. 5 and 6 show the upper zoner members 144. As shown, these zoner members are supported from a ring 294, which in turn is supported by spider members 160 from the sleeve 158. As shown, there is provided a stiffening ring 296, which extends part way (in a vertical plane) entirely around the outer circumference adjacent the outer edge portions of the upper zoner blades 144. The outer end of each blade of the zoner is provided with a rubber seal member 298 which firmly bears against and forms a seal with the interior circumference of the shell member 112. As shown, the casting supporting the upper zoner members is formed at 172 with the bearing designated in Fig. 1 by that numeral. The seal surface 170 is also provided (illustrated more fully in Fig. 1).

4. The stationary zoner member

This member is shown in Figs. 7 and 8. As shown, the zoner blades 148 are generally trapezoidal in shape, since they must conform to the shape of the lower portion of the upper zoner member 144 and the upper portion of the lower zoner member 146. The stationary zoner blades extend only part way around the apparatus, from columns 5 through 9 inclusive. The space between the last two stationary zoner blades, as previously described, is enclosed by upper and lower plates 150, which serve to provide a hollow space within the stationary zoner at this point.

5. The lower zoner member

The lower zoner member 146 is shown in detail in Figs. 10 and 11. Each individual blade 146 is provided with rubber tip portions 300 which bear up against the interior surface of the shell and lower casting members, thus providing a tight seal therebetween. In addition, the lower portions of the blades 146 are also provided with rubber seal members 304, which bear against the upper orifice plate 196.

As shown, the blades are supported from the enlarged portion 162 keyed to rotating shaft 142 by means of spider member 164. As in the case of the upper zoner member, there are provided stiffening rings 306 adjacent the outer circumference of the zoner blades 146, each of these stiffening rings extending only a short distance in a vertical plane, adjacent the upper and lower portions of the zoner blades 146.

As shown, the supporting structure for the upper zoner is formed with bearing surface 172 and seal surface 170. The seal ring 176 (shown in detail in Fig. 9) seats between the lower portion of the spider 164 and the upper orifice plate 196.

6. Upper and lower valve plates, upper and lower orifice plates, and their mode of adjustment Fig. 12 shows the lower orifice plate 194, while Fig. 14 shows the upper orifice plate 196. Figs. 13 and 15 are cross-sectional views, respectively, of these members. Fig. 20 shows the lower valve plate 190, while Fig. 22 shows the upper valve plate 192. Figs. 21 and 23 are, respectively, cross-sectional views of these members.

Referring first to Figs. 12 to 15 inclusive, it is apparent that both upper and lower orifice plates are provided with a plurality of apertures through which the stream of water flows in each of columns 1 to 8 inclusive. The lower orifice plate 194 is provided with a bent-over or depending portion 310 and a stiffening ridge 312. At one end of this stiffening ridge there is provided an enlarged boss 314 in which there is a tapped hole 316 for seating the adjusting rod 318, as shown in Fig. 25.

Upper orifice plate 196 is provided with a number of depending lugs 320, which lugs are provided with drilled holes. One of these lugs 320 serves as a housing for the adjusting rod 318, as shown in Fig. 25. As shown in Fig. 14, each edge portion 324 of the upper orifice plate is bevelled or stepped so as to seat in a corresponding bevel or step in guide member 326, as shown in Fig. 16.

In both upper orifice plate 196 and lower orifice plate 194 there are provided four mating holes or apertures 330, through which four securement bolts 332 pass, as shown in Fig. 16. Around each of these securement bolts there is positioned a spring 334 which serves to press the upper and lower orifice plate members together, bolt 332 being provided at the end with a tightening nut 336. By means of these bolts with concentric springs, the bolts passing through apertures 330, the two plates are thus pressed together at four points, without, however, holding them together so tightly that one plate may not be moved horizontally with respect to the other a slight distance so as to vary the free opening between the valve openings in the two orifice plates 194 and 196.

The construction of the lower valve plate 190 and upper valve plate 192 is similar to that of the orifice plates, except that the apertures or openings in the plates 340 are elongated instead of round. As shown in Figs. 20 and 21, the lower valve plate 190 is provided with bent-over flange portion 342 and stiffening ridge 344. The outer end of this stiffening ridge is, as in the case of the corresponding orifice plate 194, provided with an enlarged boss 346 in which a threaded hole 348 is provided. This threaded hole serves to receive the threaded end of adjusting bolt 352, as shown in Fig. 25, so that the lower valve plate may be adjusted with respect to the upper valve plate, thus controlling the size of the valve openings between the plates.

The actual construction of the valve openings is shown in Figs. 36 and 37. These figures show the construction of valve openings in the valve plates 190 and 192, but since the construction of the openings in the orifice plates 194 and 196 is identical, except for the difference in shape of these openings as previously explained, the views in Figs. 36 and 37 also illustrate orifice plate construction.

Fig. 36 shows the valve opening 191, 193, substantially wide open, while Fig. 37 shows the valve almost completely closed. It will be noted that numeral 191 represents the opening in upper valve plate 192, while numeral 193 represents the opening in the lower valve plate 190. Valve plates 190 and 192 are slidable with respect to each other, thus permitting close control of the valve opening therebetween. As shown, the opening 191 in upper valve plate 192 may be beveled, while the opening 193 has substantially right-angled sides.

It is obviously possible to move plate 190 with respect to 192 so as to open the valve openings to their widest extent so as to free material which may be caught in the openings. Similarly, it is possible to restrict the valve openings, thereby increasing the velocity of water through these openings, which will also assist in freeing the material tending to be stuck in the valve.

Upper valve plate 192, shown in Figs. 22 and 23, is provided with an apertured lug 356 which, as shown in Fig. 25, serves to provide a housing member through which the adjusting rod 352 passes. Bolts 360 bear against depending flange 342 of the lower valve plate 190 and serve also for adjusting the valve openings between valve plates 190 and 192. By turning these bolts a certain number of turns in one direction the valve openings may be completely closed; a certain number of turns in the other direction will completely open the valve openings. The adjusting rod 352 may be operated to produce fine adjustments.

As shown, there are provided four apertures designated by the numerals 362 in both valve plates 190 and 192, through which apertures extend the bolts 364 (Fig. 16). As in the case of the orifice plates 194 and 196, around each of the four bolts 364 there is provided a helical spring 368 held in place by the threaded nut 370. In this way the two valve plates 190 and 192 are pressed tightly together, without at the same time being pressed so tightly together that they cannot be moved horizontally, one with respect to the other, so as to adjust the openings between the plates, thus serving their function as valve means.

The manner in which the upper and lower orifice plates and upper and lower valve plates are secured to the lower casting 114 and the reservoir casting 116 is shown in detail view Fig. 16. As previously explained, there is provided a guide member 326, which guide member is adapted to seat beveled edge 324 of upper orifice plate 196. This guide member is shown in detail in Figs. 18 and 19. The guide member 326 is provided with lugs 374 for attachment to corresponding lugs 378 in lower casting 114. These lugs are secured together by the bolts 380 extending therethrough. It is thus apparent that by means of guide member 326 the upper orifice plate 196 is supported from the lower casting 114. The lower orifice plate 194 is of course pressed up against the upper orifice plate 196 by the spring means 334, and supported in this way from the latter.

Forming a part of the reservoir casting 116 there are provided the clevis members 384 which are adapted to seat a wedging member 386. These clevises are provided with a seat 388 adapted to coact with the wedge 386. In assembling the device the upper valve plate 192 is seated below the enlarged abutment portion 390 of the lower casting 114 and brought into contact with the upper portion of the reservoir casting 116. Wedges 386 are then placed in the clevis members 384 and securely driven in so that the upper valve plate 192 is rigidly supported between the wedges and the abutment 390 of the lower casting 114. There may be provided an aperture 392 in the wedging member 386 to assist in its insertion and removal. The lower valve plate 190 is supported by springs 368, which press it securely up against the upper valve plate 192, the entire assembly thus being supported rigidly between the abutment 390 and the reservoir casting 116 by the wedging means previously described.

The means for adjusting the upper and lower orifice plates with respect to each other, and the upper and lower valve plates with respect to each other, are shown in detail in Fig. 25. Referring to the orifice plates 194 and 196 first, it is evident that the boss 320 in upper orifice plate 196 is apertured to permit the passage of adjusting rod 318. This adjusting rod 318, as previously explained, seats in a threaded aperture 316 in enlarged boss 314 of the lower orifice plate 194. The adjusting rod 318 is provided at its outer end with a head in the form of a nut 398. There extends an operating rod 400 provided with a socket 402 to seat on the nut 398. In this way the adjusting rod 318 may be moved forward or back by a tool applied to the end of rod 400, the lower orifice plate 194 being moved slightly with respect to the upper plate 196 to adjust the opening therebetween.

The arrangement for adjusting the lower valve plate 190 with respect to the upper valve plate 192 is similar. Apertured boss 356 of the upper valve plate 192 permits the adjusting rod 352 to pass therethrough. This adjusting rod, threaded in its external end, seats in the boss 346 in lower valve plate 190, which boss is provided with the threaded aperture 348 for receiving the threaded end of the adjusting rod 352. This adjusting rod is provided at its outer end with a nut 406, around which nut seats the enlarged or socket portion 410 of the outer adjusting rod 412. In this way, by applying a tool to the outer end of adjusting rod 412, it is possible to rotate the rod 352, thus moving the lower valve plate 190 forward or back a slight distance with respect to the upper valve plate 192. This serves to adjust the opening therebetween whereby the valve plates perform their function as valve.

The construction of the lower casting 114, as shown in Fig. 25, may now be described. Lower casting 114 is provided with cover plate 416, in which gland 418 is provided. The outer end of this gland is provided with cap 420. Similarly, the lower cover plate 424 is provided with enlarged portion or gland 426 and cover 430. Adjusting rods 400 and 412 pass through drilled openings in the gland members 418 and 426 of cover plates 416 and 424. Appropriate bolting means 536 are provided for bolting the cover plates to the lower casting 114.

As shown, there is provided a flexible member 432 pressed against the upper portion of the upper orifice plate 196 by the bearing plate 434. Similarly, at the upper portion of the upper valve plate 192, there is provided a flexible member 438 pressed against it by means of plate 440. This serves to seal the assembly and prevent leakage. As shown at 442, the cover plate 424 is bolted to the reservoir casting 116.

7. Construction of the shell, lower casting, and reservoir casting

The constructions of these various castings comprising, together with the upper casting, the housing of the hydraulic classifier apparatus, are shown in Figs. 24 and 27 to 33 inclusive.

Fig. 24 shows the shell member 112. As shown in Fig. 1, this is formed with a flange 450 which is adapted to cooperate with a corresponding flange 452 on the upper casting 110. There is provided a series of holes 454, through which the securement bolts securing the upper casting to the shell are adapted to pass. The shell is formed with stiffening ribs 460 for strengthening purposes.

As shown, there is a plurality of doors 462 positioned in the shell, which doors are secured to enlarged bosses 464 on the shell casting by means of bolts 466. Two or more of these doors may be positioned as shown.

The lower casting 114 and its associated cover plates are shown in Figs. 27 to 31 inclusive. In this view the apertured ears 378 of the extending radial arms 470 are visible. As shown in Fig. 16, these apertured ears are adapted to receive bolts 380 to secure the lower casting to the guide section 326 which, in turn, supports upper and lower orifice plates 196 and 194. These radial arms are provided with an enlarged flange portion 472 for reenforcement purposes.

The series of holes 476 is adapted to coact with corresponding holes 478 in the lowermost casting, reservoir casting 116. Through these holes attachment bolts may be passed for securing the two sections together. At the portions of the lower casting 114 corresponding to hydraulic columns 9 and 10, there are provided a series of tapped holes 480 for receiving the rods 482 (Fig. 1) for supporting the outlet valves 210 and the funnel-shaped casting 484 at the lower end of which is formed outlet for heavy material 220. As shown in Fig. 27, the bottom plates 486 in that portion of the lower casting 114 corresponding to hydraulic columns 9 and 10 are provided with circular openings 490 forming the outlet to the discharge valves 210 (Fig. 1).

The tapped holes 494 in the bottom plates 486 serve to coact with corresponding holes 496 in the reservoir casting 116 (Fig. 32) for the reception of securement members for holding the two sections together. The tapped holes 500 around the external circumference of the lower casting 114 are for the cover plate and glands 416 and 424 (Fig. 25), a detailed view of one of these cover plates and its gland being shown in Fig. 29.

As shown, there is provided a series of radial stiffening ribs 504, which serve to strengthen the lower casting 114. A series of holes 508 is provided in this casting to cooperate with corresponding holes 510 in the reservoir casting (Fig. 32) so that securement bolts 512 (Fig. 1) may be passed therethrough for the purpose of holding the two castings together.

The series of holes 516 adjacent the central portion of the lower casting 114 is adapted to hold the cover plate 156 for the bearing for shaft 142 securely in place (see Fig. 1). As shown in the latter figure, the lower casting member is joined with the cover plate 156 by means of securement bolts 522 passed through the openings 516. For the purpose of tightening this bearing in place it is provided with adjusting screw 526.

Fig. 28 shows a typical elevation of one column of the lower casting 114, as that lower casting is constructed at those portions thereof extending from hydraulic column 1 through hydraulic column 8, inclusive. Fig. 30 is a typical elevation of one column of the lower casting 114 as that lower casting is constructed at its portions thereof corresponding to hydraulic columns 9 and 10. The positions where the elevations of Figs. 28 and 30 are taken are clearly indicated on Fig. 27.

The openings 530 and 532 (Fig. 28) are positioned in the lower casting 114 so that the lower and upper orifice plates 194 and 196 and lower and upper valve plates 190 and 192 may be easily inserted in the hydraulic classifier assembly. As shown in the detail cross-sectional view, Fig. 25, after the orifice plates and valves plates are set in place these openings are intended to be covered by cover plates 416 and 424 respectively. A typical cover plate with its associated gland 426 is shown in Fig. 29.

The holes 500 provided in the lower casting are adapted to receive the bolts 536 (Fig. 25) for securing the cover plates 416 and 424 to the lower casting, after the orifice and valve plate assembly have been inserted. The series of apertures 540 is adapted to hold the bolts 542 (Fig. 25) for seating the retaining plates 434 and 440 which hold the sealing members 432 and 438 in place.

The notches 544 in lower casting member 114 serve as guides in seating the orifice plates 194 and 196. The grooves 546 are adapted to seat the valve plates 190 and 192. As shown most clearly in Fig. 28, there is provided an extending boss or supporting enlargement 550 which serves to press down upon the upper valve plate 192, thereby supporting this plate to prevent its movement or breakage by the fluid pressure applied below (see Fig. 25). Since the orifice plates are not subjected to any substantial pressure from below, there is no necessity for providing such an enlarged boss for supporting the upper orifice plate.

As shown in Fig. 30, that portion of the lower casting adjacent hydraulic columns 9 and 10 is provided with a door opening 552 adapted for the reception of a door member 554, shown also in Fig. 1. This door may be held in place by passing securement bolt members through the apertures 558 formed therein, which match with corresponding apertures 560 formed around the door opening of the lower casting 114. The removable plug 562 below the door serves to permit drainage and observation of the contents of the lower portions of hydraulic columns 1 and 10. The refuse or heavy particles discharge openings 490 are indicated by the dotted lines in Fig. 30. There are also provided two water inlets 564 at which jets for flushing the interior of the casting at these portions, adjacent the bottoms of hydraulic columns 1 and 10, may be introduced.

The lowermost casting, the reservoir casting 116, is shown in detail in Figs. 32 and 33. As shown, this casting is partially cut out at those portions of the apparatus corresponding to hydraulic columns 1 and 10. This view shows the perforated side walls 186 through which the stream of water flows from the reservoir 184 to the chambers 188 below hydraulic columns 1 to 8, inclusive. There are positioned in the bottom of this casing eight openings 566, which are the valve openings for the drainage valves 232 (Fig. 1).

In this view the series of holes 570 is adapted to seat the bolts 572 (Fig. 1) for attaching the fluid inlet section 180 to the reservoir casting 116. As shown in Fig. 1, the upper part of this fluid inlet section 180 is adapted to seat the float valve 182.

The series of apertures 510, as shown in Fig. 1, is adapted to seat the bolts 512 which secure the reservoir casting 116 to the lower casting 114. The extending lug 578 forms a support for the pivot 580 of the pivoted arm 584 supporting the float valve 182 (Fig. 1).

The clevis sections 384 (Figs. 16 and 17) are also shown in Fig. 32, which clevis sections are adapted to seat the wedging members 386, as previously explained.

As shown, there is provided a plurality of openings 590 into the reservoir casting adapted to seat the removable plugs 592 (Fig. 1). Through these openings access to the lower section of hydraulic columns 1 to 8 inclusive, for cleaning purposes, may be had.

As shown in the elevational view Fig. 33 (also in Fig. 1) the lower portion of the casting 116 leading to the valve openings 566 for valves 232 is constructed in conical form. In this view there is also shown the lowermost portion 594 of the reservoir casting which encloses the reservoir 184.

*8. Discharge of refuse material from apparatus and automatic means for controlling discharge*

The heavy particles, those of apparent density greater than that of the permanent or recirculated bed E in Fig. 35, are discharged through valves 210 and 220 at the bottoms of columns 9 and 10 out of the classifier. Valves 210 each comprise the two plates 214 and 216, the lowermost plate 216 being rotatable with respect to the other by means of rod 604. There are mating openings formed in these plates and the valve 210 is completely opened when the openings are coincident. When the openings do not mate the valve is closed.

To assist in removing the refuse material through valves 210 and through exit opening or valve 220 there is provided a stream of water introduced through conduits 664. This stream of water flows circumferentially within the funnel-shaped casting 484, thus serving to assist in the removal of refuse material positioned within said funnel-shaped casting. The discharge outlets, at the bottoms of columns 9 and 10, are of the general type known as the vortex outlet.

Water for the circumferentially moving stream introduced through conduits 664 is supplied from the reservoir 184 formed in the reservoir casting 116. As shown more especially in Fig. 26, this water is withdrawn from the chambers 188 in hydraulic columns Nos. 1 and 8 by the communicating conduits 660, 662 and 664, the latter conduit introducing the water stream inside the funnel-shaped casting 484. Each of these series of conduits is controlled by the valve marked V in that figure. As previously pointed out, the water, or other hydraulic fluid, present in chambers 188 of columns 1 and 8 flows thereinto from the reservoir 184 through the perforated section 186 of reservoir casting 116.

The discharge of refuse or heavy materials at the bottoms of hydraulic columns 9 and 10 is automatically controlled by the "Fulscope" apparatus. Fig. 34 is a schematic view illustrating the operation of this device and the connecting conduits which serve to operate the valve from the "Fulscope" operating mechanisms designated by the numerals 602 and 602' in that figure. The word "Fulscope" is a trade-mark name for pneumatically-actuated control manometer manufactured and sold by the Taylor Instrument Company.

As shown in Fig. 1, rod 604 serves to rotate the lower valve plate 216 of the valve 210. This lower valve plate 216 is operated by pneumatically actuated operating cylinder 212. In one position the operating cylinder rotates rod 604 to a point at which the valve 210 is completely closed. At another position the rod 604 is rotated to a point where the valve 210 is completely open. As will be more fully pointed out hereinafter, opening and closing of this valve is controlled in accordance with the hydraulic conditions prevailing within the apparatus.

Referring specifically to Fig. 34, it will be noted that there are provided two operating cylinders 212 which control, respectively, rods 604 operating the valves 210 at the bottoms of hydraulic columns 9 and 10. There are also provided two pneumatically actuated cylinders 213 which serve to operate plungers 702. One of these plungers is located at the bottom of column 9, and the other at the bottom of column 10, as shown in Fig. 1 of the drawings. These plungers are in operative connection with the clamping members 224 positioned around the flexible discharge members 222. When the pneumatically actuated cylinder 213 is in one position the valve opening through flexible member 222 is reduced to its minimum dimensions. When the plunger 702 is moved by the pneumatically actuated cylinder 213 to its other extreme position the flexible discharge member 222 is pressed to such a position that the valve opening is at a maximum.

In operation, by means of an automatic mechanism which will subsequently be explained, as the recirculated bed or stratum of heavy material E tends to build up in certain selected hydraulic columns, the pressure differential between two selected points in the column increases. As the result of this increase in pressure, by means of the Fulscope mechanism, the cylinder 212 in operative connection with one of the hydraulic columns, column 9 for example, is actuated to open valve 210 so that some of the heavy material is permitted to escape. Since the amount that can escape is controlled by the size of opening 220, if the pressure differential continues to build up, cylinder 213 is also actuated to release flexible member 222 to a position at which the valve opening 220 is a maximum. In this way additional heavy material is permitted to discharge from the bottom of the hydraulic column. If, regardless of valves 210 and 220 in one hydraulic column being both wide open, the pressure differential still continues to build up, the valve outlet 210 in the other hydraulic column, column 10, is actuated by means of its pneumatically operated cylinder 212 so that valve 210 is opened. If opening valve 210 in the second column is not sufficient to discharge enough material to relieve the condition of increased pressure differential, then the second cylinder 213 in the second hydraulic column, column 10, is also actuated to open its valve 220 to its most wide-open position.

It is thus evident that there are provided four specific rates of discharge for controlling discharge of heavy material through the outlets at the bottoms of hydraulic columns 9 and 10, which means are automatically regulated in proportion to increase in the pressure differential within the selected hydraulic columns. All four of these means need not be actuated in order that the pressure differential conditions may be maintained substantially constant within the hydraulic column, but if they are needed to maintain the pressure differential substantially constant they are available for this purpose and are automatically actuated to control the amount of heavy material discharged.

The pressure differential is measured between two points in the apparatus, for example the points indicated by the letters R and S in Figs. 1 and 34. Point R is some few inches below the level of liquid in the hydraulic column, whereas point S is positioned, as shown, adjacent the lower zoner. This controlling apparatus may, as desired, be located in one or more selected hydraulic columns.

Referring to Fig. 34, conduits 241 and 241' lead from point R to Fulscope control apparatus designated by the numerals 602 and 602'. The conduits 239 and 239' similarly lead from point S to the operating manometers 602 and 602'. The conduits 239 and 239' are, as shown, branched at their terminal portions to provide conduits 242 and 242' leading inside of the shell 112 of the hydraulic classifier. As the zoners with rubber tip portions 300 rotate within the shell, it is evident that the rubber-edged blade, on its passage, will periodically cover the outlet to one of the lines, in which event the branched conduit is available to transmit hydraulic pressure. The conduits 239 and 242 may be in operative connection with cylinders 212 and 213 of one hydraulic column, for example column 6, while the lines 239' and 242' may be in operative connection with cylinders 212 and 213 of the other hydraulic column, for example column 7.

Compressed air for actuating the mechanism is drawn in from air supply line 610 through pressure reducer 620 and filter 623 in pipe line 612 to operating motor 602; and through pressure reducer 621 and filter 624 in conduit 614 to operating mechanism 602'. As shown, these lines are controlled, respectively, by valves 616 and 618.

The filtered air leaving filter 623 travels through conduit 626 to control mechanism 602. The filtered air leaving filter 624 travels through pipe line 625 to motor 602'. The pressure of the air in both lines is carefully adjusted and regulated by means of the pressure reducers 620 and 621.

As previously explained, lines 239 and 241 lead to control mechanism 602, while lines 239' and 241' lead to motor 602'. As the pressure differential between points R and S, transmitted to the control mechanisms 602 and 602' by means of these conduits, is varied, control mechanisms 602 and 602' release a certain amount of the compressed air supplied to them by lines 625 and 626. This compressed air is transmitted via pipe lines 630 and 632, controlled by valves 634, 637, 636 and 639, to the interconnected conduits designated by the numerals 642. Various valves are designated by the letter V such, for example, as the valve 638 providing, as desired, for intercommunication between conduits 630 and 632. The stream of air serves first to actuate bellows valves 704 which serve to actuate cylinder 212 controlling valve 210 at the bottom of hydraulic column 9. When the pressure differential increases, if opening valve 210 in column 9 in this manner does not correct the condition of increased pressure differential, then bellows valves 708 controlling the operation of cylinder 213 at the bottom of column 9 is actuated so that the valve opening 220 in the flexible member 222 at the bottom of column 9 is increased. If the pressure differential is not corrected by actuation of operating cylinders 212 and 213 at the bottom of hydraulic column 9, then cylinder 212 at the bottom of column 10 is similarly actuated by means of bellows valves 712. Finally, as previously pointed out, if this is not sufficient, actuating cylinder 213 for column 10 is operated by the stream of compressed air by means of bellows valves 718, thus opening valve 220 in flexible member 222 at the bottom of column 10 to its wide-open position.

Of course, if the pressure differential is reduced due to the elimination of too much of the permanent or recirculated bed of heavy materials E in the column selected for controlling operation of the device, then the valves 210 and 220 at the bottom of columns 9 and 10 are correspondingly closed, in sequence, by means of the same operating cylinders and bellows valves until heavy material building up in the hydraulic column corrects the condition of reduced pressure differential.

In this way variations in fluid pressure between points R and S in the system serve to operate discharge of heavy material from columns 9 and 10, thus providing and maintaining a permanent bed of recirculated material within the hydraulic classifier apparatus.

9. Principles of operation

My improved classifier apparatus involves the utilization of certain essential principles of operation. Among such principles is that of permitting the feed material which is to be subjected to classification to enter the apparatus at a point where the apparatus has been emptied or is free of solid material. After entering at this point, the material to be classified travels through the machine, wherein it is subjected to controlled classification by successive hydraulic currents of increasing intensity. This results in the early removal of solid material which is easily separated. Time is also allowed for the separation of those materials in the feed which are classified only with difficulty. A fundamental principle of operation underlying hydraulic classification in accordance with my improved method is that the fresh feed should not be mixed with the partially classified feed. This means that all material, except that comprising the permanent or recirculated bed E, must be removed from the apparatus, even if this includes some solid particles which are not efficiently classified because of their relative slowness in responding to the impressed conditions of classification.

In the developed section Fig. 35 the vertical arrows indicate the conditions which are maintained in the various hydraulic columns 1 to 8 of the typical apparatus described herein. The feed enters at points M and N in columns 10 and 1 and is permitted to fall freely until it has filled the spaces within the machine open to it. The top zoner 144, under typical conditions of operation, may be rotated at a relatively slow speed such, for example, as one of approximately 0.75 revolution per minute. The feed is displaced by the blades of the upper zoner in the direction indicated by the upper horizontal arrows in Fig. 35. The feed in columns 10 and 1 through 4 inclusive, after falling through the space in which the upper zoner travels, enters a relatively clear space since the blades of the stationary zoner 148 are omitted in columns 10 and 1 to 4. The free-falling material then enters the space in which the bottom zoner 146 rotates. Under typical conditions of operation, this zoner is rotated somewhat faster than the upper zoner, a rotational speed of 3 revolutions per minute being desirable. The blades of the bottom zoner carry the relatively coarser material around through the machine and subject it to the successive upward currents of increasing intensity in columns 2 to 8 inclusive. At the same time the upper zoner, operating at a slower rotational speed, advances material caught between its blades over the successive hydraulic currents of increasing intensity. The material in the upper zoner is also subjected to the influence of the successive weir take-outs, indicated generally by the numerals 198 in Fig. 35.

The material of larger diameter in the feed, the coarser particles, will of course have the greater tendency to fall. They will tend to drop more quickly to the bottom of the machine, to the space wherein lower zoner 146 rotates, thus resulting in semi-classification of the material. The open space in columns 10 and 1 through 4 inclusive, where the blades of the stationary zoner 148 have been omitted, will permit the water displaced by the incoming feed to move horizontally. This water then moves upwardly and out of the machine over the weirs at the two discharge points at the tops of hydraulic columns 2, 3, and 4. The amount of this displaced water, together with the intensity of the hydraulic stream supplied at the bottoms of hydraulic columns 1 to 8 inclusive, is carefully regulated to lift out over the weir discharges the finer solid particles present in the feed, leaving behind coarser coal, together with some heavier particles of fine refuse. This residual material is subjected to further hydraulic treatment within the machine. Since the upward flow of water through the bottom zoner consists only of the relatively small amount of water applied at the bottoms of hydraulic columns 2, 3, and 4, in which columns the intensity of the upward water stream is relatively small, the coarser material not readily separated at the tops of hydraulic columns 2, 3, and 4 will be maintained in this zoner in a fluid mass. This will result in a condition of hindered settling, wherein the lower gravity particles are prevented from readily dropping to the bottoms of the hydraulic columns and are effectively classified through the agency of this fluid mass, constituting the permanent or recirculated bed E.

It is evident that the permanent or recirculated bed of refuse material E will constitute a high gravity fluid mass. All material above this permanent bed will come under the influence of the hindered settling classification typical of classification methods wherein such high gravity fluid masses are utilized. At points wherein the feed material does not come in contact with this high gravity fluid mass, such for example as the upper portions of hydraulic columns 2, 3, and 4, the classification is effected principally by means of the upward hydraulic currents supplied at the bottoms of the hydraulic columns. Thus, in my method, true hydraulic classification is combined with hindered settling in order to secure most efficient classification.

As the charge is advanced around the machine through the various hydraulic columns, classification continues under the more accurate conditions of classification resulting from util' ition of the high density fluid mass formed by the permanent bed E. Any materials out of their proper position in the various zones will adjust themselves by rising or falling until they reach their proper zone or stratum. As the material is advanced through the machine the permanent or recirculated bed E and refuse bed F are expanded and by this displacement raises the material above it into the upper portion of the classifier apparatus. Part of this lighter material is discharged over the weirs at the upper portions of hydraulic columns 4 to 8 inclusive. In the stationary zoner, extending from hydraulic columns 5 through 9 inclusive, the solid material is retained without horizontal movement. As successive quantities of lighter material are pushed up into this section, this lighter material builds up until it has completely filled the stationary zoner. It then spills over the top into the upper zoner which, in turn, imparts to it a horizontal displacement at a slower rate than that of the material held within the blades of the lower zoner. This transportation of the lighter material by the upper zoner brings that material to a position where, consequent upon expansion of the heavier material, the lighter material is pushed into the stationary discharge section, whence it flows over the weirs at the tops of hydraulic columns 6, 7 and 8.

In stating the general conditions prevalent within my apparatus, it may be stated that the incoming feed is first subjected to semi-classification while in a dense condition. It is advanced by the moving zoners through the machine and is expanded, as shown by the various strata in Fig. 35, in such a manner that it pushes the lighter particles out over the top of the machine. Since part of the operation of the machine is effected by expansion of the strata, a substantial portion of the lighter material is forced over the weirs at the tops of the hydraulic columns by the application at the base of these hydraulic columns of upward currents having a velocity of only approximately one-half that of the free-falling velocity of the particles displaced. Operation in this manner involves the utilization of the high density fluid mass made up of the heavy refuse. This constitutes recirculated bed E above refuse bed F on which the valuable coal particles float and through which the coal particles, or other light mineral values, cannot pass. As previously explained, the amount of this bed is kept under careful control by means of the control instrument, which instrument serves to operate valves 210 and 220, in response to changes in differential pressure. This differential pressure may be that existing between two points in the machine, one for example near the top of a selected hydraulic column and the other adjacent its bottom. The bed is so controlled that in the last column, column No. 8, when it is in its maximum expanded condition, it just reaches the top of upper zoner 144. Thus stratum D is forced to leave the machine at the top of column 8 since the expansion of strata E and F below it leaves no place for the upper stratum to go.

In practice I have observed that the stratum E, which forms the permanent or recirculated bed, will consist of a very narrow range of sizes. This material will be intermediate in size between that of particles comprising the refuse F and that of the particles comprising the last coal-containing layer D. Of course, there is some variation in the character of the particles within the stratum E. Particles adjacent the bottom of the stratum will resemble the particles in the refuse F, while the particles in the upper part of stratum E will resemble and will be substantially commensurate in size and gravity with the particles in stratum D.

As an example of carrying out my improved method of classification to effect the classification of coal in the various sizes, the following may be given.

EXAMPLE

There is fed into columns 10 and 1, at points M and N through hopper 122, a mixture of No. 4 and No. 5 buck anthracite coal. This material may be fed in the mixed condition, or the No. 4 buck may be fed in at M and the No. 5 buck fed in at N. The feed is supplied at the rate of 30 tons per hour. The upper zoner is rotated at a rotational speed of ¾ revolution per minute, while the lower zoner is rotated at a rotational speed of three revolutions per minute.

The upward currents supplied at the bottoms of hydraulic columns 1 to 8 inclusive are as follows:

| Hydraulic column | Velocity of stream |
|---|---|
| | Feet per minute |
| 1 | 1 |
| 2 | 1.5 |
| 3 | 2 |
| 4 | 4 |
| 5 | 8 |
| 6 | 10 |
| 7 | 12 |
| 8 | 17 |
| 9 and 10 | (¹) |

¹ No upward current.

The currents flowing over the weirs in hydraulic columns 2 to 8 inclusive will have the following velocities:

| Hydraulic column | Intensity |
|---|---|
| | Feet per minute |
| 2 | 5 |
| 3 | 6 |
| 4 | 7 |
| 5 | 8 |
| 6 | 10 |
| 7 | 12 |
| 8 | 17 |

It is evident that in columns 2, 3, and 4 the water flowing over the top of the weirs has a velocity greater than that of the stream introduced at the bottoms of the hydraulic columns. This is of course due to the water displaced by introduction of the solid particles comprising the feed.

Feeding at the rate of 30 tons per hour, heavy refuse is discharged through the outlets at the bottoms of columns 9 and 10 at the rate of 7.5 tons per hour. The various feeds, illustrated in Fig. 35, will be composed of particles of the following sizes:

Stratum A.—Extreme fine material, coal 28–65 mesh.
Stratum B.—Coal 20–35 mesh.
Stratum C.—Coal 10–20 mesh; small amount of refuse 35–65 mesh.
Stratum D.—Coal 8–14 mesh; small amount of refuse 20–35 mesh.
Stratum E.—Recirculated bed comprising coal of approximately 8 mesh and refuse of 20 mesh.
Stratum F.—Heavy refuse 8–20 mesh.

These mesh sizes are given in the Tyler Standard. It should be noted, for example, that discharged strata C and D, when both contain small amounts of refuse, are readily cleared of their refuse material by passage over a screen. Because of the substantial difference in size between the diameter of the average coal particle and the diameter of the average refuse particle in each of these strata, separation of the coal from the refuse is easily secured by simple screening.

It is evident that many changes might be made in both process and apparatus which would nevertheless come within the purview of my invention. Many various different embodiments of this invention, in addition to that herein described as one preferred embodiment thereof, may be designed which would not depart from the spirit and scope thereof. Accordingly, the invention is not to be restricted to specific embodiments, specific details of operation, specific features of construction, etc., except as necessitated by the prior art and appended claims.

I claim:

1. The method of separating from each other bodies that are amenable to hydraulic separation, which method comprises; introducing a mass of such bodies into the upper portion of a hydraulic column containing liquid of less specific gravity than that of said bodies; permitting said bodies to arrange themselves under the influence of the hydraulic conditions obtaining in said hydraulic column so that a plurality of classified zones containing bodies of varying settling characteristics in said liquid are formed in said column; moving at least one of said classified zones containing bodies of varying settling characteristics as a unit without substantially destroying the classification, in bulk by positive conveyance, independently of the hydraulic conditions imposed, and thus at a speed and time selectable independently of the physical characteristics of the bodies to a second hydraulic column wherein there is maintained an expansible layer of solid bodies separate from said mass of bodies introduced into the upper portion of said hydraulic column, said layer being suspended in liquid, whereby the bodies in said zones which have substantially no tendency to settle in said layer of suspended solid bodies are displaced upwardly by action of said layer of solid bodies suspended in liquid and thence to a position where they may be segregated, and the bodies present in said zones which tend to settle in said layer of suspended solid bodies settle therein and are withdrawn downwardly to a position at which they may be segregated.

2. The method of separating from each other bodies that are amenable to hydraulic separation, which method comprises: introducing a mass of such bodies into the upper portion of a hydraulic column containing liquid of less specific gravity than that of said bodies; permitting said bodies to arrange themselves under the influence of hydraulic conditions obtaining in said column so that zones containing bodies of varying settling characteristics in said liquid are formed in said column; removing from further treatment that portion of said bodies which is displaced upwardly under said hydraulic conditions, the remaining bodies present therein being subsequently subjected to the action of different hydraulic conditions in a second hydraulic column; maintaining a permanent bed of solids suspended in said liquid; moving at least one of said zones of varying settling characteristics and its contained bodies which are to be subjected to different hydraulic conditions in said second hydraulic column, a portion of said contained bodies constituting part of said permanent bed of solids, in bulk by positive conveyance, independently of the hydraulic conditions imposed, and thus at a speed and time selectable independently of the physical characteristics of said bodies, to a position wherein said zones are subjected to said hydraulic conditions different from those first applied; and expanding said permanent bed of solids suspended in liquid, said solid bodies of lighter gravity in said zones being thus displaced upwardly by expansion of said permanent bed to a position at which they may be segregated, while bodies of higher gravity than that of said permanent bed present in said zones are permitted to sink through said bed downwardly to a point at which they may be segregated.

3. The method of separating from each other bodies that are amenable to hydraulic separation, which method comprises; introducing a mass of such bodies into the upper portion of a hydraulic column, said hydraulic column containing liquid of less specific gravity than that of said bodies; permitting said bodies to arrange themselves under the influence of the hydraulic conditions obtaining in said column, thus to form zones containing bodies of varying settling characteristics in said hydraulic column; maintaining a permanent recirculated bed of solids suspended in liquid, which bed is capable of expansion by the application thereto of continuous hydraulic currents of varying intensities; expanding said permanent bed by continuously applying thereto a plurality of hydraulic currents of increasing intensities; moving at least one of said zones containing bodies of varying settling characteristics to a position wherein it may come under the influence of said expanding permanent recirculated bed, whereby the fractions of apparent specific gravity less than that of said permanent recirculated bed are displaced upwardly by expansion of said bed, while fractions of apparent specific gravity greater than that of said permanent recirculated bed sink through said bed: and separately withdrawing said displaced fractions.

4. The method of separating from each other solid bodies that are amenable to hydraulic separation, which method comprises; introducing a mass of such bodies into the upper portion of a hydraulic column, said hydraulic column containing liquid of less specific gravity than that of said bodies; permitting said bodies to arrange themselves under the influence of the hydraulic conditions obtaining in said column, thus to form zones containing bodies of varying settling characteristics in said hydraulic column; removing from further treatment that portion of said bodies which is displaced upwardly under said hydraulic conditions, the remaining bodies present therein being subsequently subjected to the action of different hydraulic conditions in a second hydraulic column; moving at least one of said zones containing said remaining bodies to be subjected to the action of said second hydraulic column to said second hydraulic column wherein said bodies may be subjected to hydraulic conditions different from those prevailing in said first-named hydraulic column; discharging the lighter material displaced adjacent the top of said last-named hydraulic column; and discharging the heavier material adjacent the bottom of said last-named column, said discharge of heavier material being so controlled that there is provided within the column an expansible permanent bed of solids suspended in said hydraulic liquid, which permanent bed acts as a fluid separation mass of increased apparent specific gravity, and positively displaces said lighter material adjacent the top of said hydraulic column by expansion of said permanent bed under the action of the hydraulic conditions prevailing within said hydraulic columns.

5. The method of separating from each other solid bodies that are amenable to hydraulic separation, which method comprises: introducing a mass of such bodies into the upper portion of a hydraulic column, said hydraulic column containing liquid of less specific gravity than that of said bodies; permitting said bodies to arrange themselves under the influence of the hydraulic conditions prevailing in said column, thus to form zones containing bodies of varying settling characteristics in said hydraulic column; removing from further treatment that portion of said bodies which is displaced upwardly under said hydraulic conditions, the remaining bodies present therein being subsequently subjected to the action of different hydraulic conditions in a second hydraulic column; maintaining within said second hydraulic column an expansible permanent layer of solid materials suspended in hydraulic liquid, said permanent layer constituting a medium having an apparent specific gravity greater than that of said hydraulic liquid and being capable of expansion under the action of said hydraulic conditions; introducing at least one of said zones containing said remaining bodies to be subjected to treatment in a second hydraulic column into a second hydraulic column containing said expansible permanent layer; removing lighter materials positively displaced by the expansion of said expansible permanent layer in said hydraulic column; and separately collecting heavier materials of apparent specific gravity greater than that of said permanent layer present in said mass of bodies subjected to classification.

6. The method of separating from each other bodies that are amenable to hydraulic separation, which method comprises: introducing a mass of such bodies into the upper portion of a hydraulic column containing hydraulic liquid of less specific gravity than that of said bodies; permitting said bodies to arrange themselves under the influence of the hydraulic conditions prevailing in said hydraulic column so that zones containing bodies of varying settling characteristics in said liquid are formed in said column; removing from further treatment that portion of said bodies which is displaced upwardly under said hydraulic conditions, the remaining bodies present therein being subjected to the action of different hydraulic conditions in a second hydraulic column; moving at least one of said zones containing said remaining bodies to be subjected to treatment in a second hydraulic column into said second hydraulic column wherein there is maintained an expansible layer of solid bodies suspended in liquid, thus forming an expansible fluid separating medium of greater apparent specific gravity than that of said hydraulic liquid, said medium being capable of being expanded under the action of hydraulic conditions prevailing, whereby the bodies in said zones which have substantially no tendency to settle in said layer of suspended solid bodies are displaced upwardly by the expansion of said expansible fluid separating medium and thence removed to a position where they may be segregated, and the bodies present in said zones which tend to settle in said layer of suspended solid bodies settle therein and are withdrawn downwardly to a position at which they may be segregated.

7. The method of separating from each other bodies that are amenable to hydraulic separation, which method comprises: introducing a mass of such bodies into the upper portion of a hydraulic column containing liquid of less specific gravity than that of said bodies; permitting said bodies to arrange themselves under the influence of the hydraulic conditions obtaining in said hydraulic column so that zones containing bodies of varying settling characteristics in said liquid are formed in said column; removing from further treatment that portion of said bodies which is displaced upwardly under said hydraulic conditions, the remaining bodies present therein being treated under different hydraulic conditions in a second hydraulic column; maintaining in an adjacent hydraulic column an expansible permanent bed of solid bodies suspended in liquid, said solid bodies constituting a high density fluid mass; subjecting said remaining bodies to be treated under different hydraulic conditions to the classifying action of said expansible permanent bed of solids suspended in hydraulic liquid, whereby bodies of apparent specific gravity less than that of said high density fluid mass are displaced upwardly by expansion of said permanent bed, and bodies of apparent specific gravity greater than that of said high density fluid bed are displaced downwardly through said bed; and separately collecting said displaced bodies.

8. The method of separating from each other solid bodies that are amenable to hydraulic separation, which method comprises; maintaining an expansible permanent bed of solid bodies suspended in hydraulic liquid, thus providing a hydraulic fluid mass of apparent specific gravity greater than that of said liquid; introducing a mass of the bodies to be separated into a hydraulic column provided with an upward current of liquid wherein they come under the influence of said current and are thus subjected to primary classification; thereafter bringing said partially classified mass of solid bodies in said classified state, without substantial intermingling with other bodies, into contact with said expansible permanent bed of solid bodies suspended in liquid, thereby completing said hydraulic classification; and expanding said expansible permanent bed by means of an upward current of liquid; thus positively displacing part of said classified mass of solid bodies by expansion of said permanent bed and conveying said displaced part to a position out of contact with said hydraulic column and said expansible permanent bed.

9. The method of separating from each other solid bodies that are amenable to hydraulic separation, which method comprises; introducing a mass of such bodies into the upper portion of a hydraulic column, said hydraulic column containing liquid of less specific gravity than that of said bodies; permitting said bodies to arrange themselves under the influence of hydraulic conditions prevailing in said column, thus to form zones containing bodies of varying settling characteristics in said hydraulic liquid; maintaining in adjacent hydraulic columns an expansible permanent layer of solid materials suspended in hydraulic liquid, said permanent layer constituting a medium having an apparent specific gravity greater than that of said hydraulic liquid, and being adapted to be expanded in said adjacent hydraulic columns by means of continuously applied hydraulic streams of increasing intensities applied thereto; bringing at least one of said zones containing bodies capable of further separation into contact with said permanent layer of solid materials suspended in hydraulic liquid; expanding said permanent layer by applying thereto continuous hydraulic streams of increasing intensity, thus displacing upwardly materials present in said mass which are of apparent specific gravity less than that of said layer, materials in said mass of apparent specific gravity greater than that of said layer dropping downwardly therethrough; and separately collecting said material of lesser apparent specific gravity and said material of greater apparent specific gravity.

10. The method as defined in claim 9 wherein the amount of material of greater apparent specific gravity withdrawn after passage through said expansible permanent layer is so regulated as to provide for the continuous maintenance of said permanent layer of solid materials suspended in hydraulic liquid.

11. In a separator apparatus, in combination, a generally circular tank for hydraulic liquid; a transporting member for transporting materials to be separated mounted in said tank for horizontal travel therein, said transporting member having an open top to provide for the discharge therethrough of hydraulically lifted material; a second transporting member for transporting materials to be separated mounted in said tank below said first-named transporting member and adapted to receive materials leaving said first-named transporting member; means for supplying to said tank streams of hydraulic liquid of varying intensities in order to effect hydraulic classification of materials present in said transporting members; means for supplying to said first-named transporting member solid materials to be hydraulically separated in said apparatus; and a stationary member formed with a plurality of radial blades extending part way around said tank positioned between said first-named or upper transporting member and said second-named or lower transporting member, said radial blades where present in said stationary member serving to retain materials under the influence of said streams of hydraulic liquid for a period of increased duration.

12. In a separator, in combination, a vertically extending tank generally circular in cross-section; a plurality of horizontally rotating zoner members positioned within said tank and provided with radially extending blades to move the materials to be classified circumferentially throughout said tank; means for introducing materials to be classified into the upper portion of said tank; means for supplying at the bottom of said tank a plurality of upward hydraulic streams of varying intensities, said upward streams serving to effect classification of solid materials present within said tank, said last named means including a storage reservoir for hydraulic fluid and a plurality of controllable valve means positioned in said tank and adapted to control the flow of hydraulic fluid from said storage reservoir to said material to be classified; and automatically operated means, operated in response to variations in fluid density prevailing within said tank, for so regulating the discharge of heavy materials at the bottom of said tank that a permanent recirculated bed of solids suspended in the hydraulic liquid is maintained within said tank, thereby providing an operating medium having an apparent specific gravity greater than that of said hydraulic liquid.

13. In a separator device, in combination, a tank for hydraulic liquid, said tank being generally circular in cross-section; a receptacle provided with radial blades for transporting materials to be separated mounted in said tank for horizontal travel therein, said receptacle having an open top to provide for the discharge therethrough of hydraulically separated material; means for supplying to said receptacle materials to be separated; means for supplying at the bottom of said tank upward currents of hydraulic liquids, said currents serving to effect hydraulic separation in said separator; a horizontally positioned pair of orifice plates positioned so that said receptacle for transporting material has its lower edge portion travelling on said orifice plates, said orifice plates being provided with valve openings therebetween to permit passage of said hydraulic liquid; a pair of horizontally positioned valve plates located below said pair of orifice plates, said valve plates serving to regulate the volume and velocity of the hydraulic liquid supplied to said separator; means for removing lighter bodies, said removal means being located above said material transporting receptacle; and means for removing heavier material from said separator below said material transporting receptacle.

14. In a separator apparatus utilizing a high density fluid mass, in combination, a tank for hydraulic liquid; a receptacle for transporting solid materials to be separated mounted in said tank for horizontal travel therein; hydraulic means for classifying material within said receptacle into a desired solid fraction and refuse; a discharge outlet for discharging refuse from said tank positioned below said receptacle; valve means provided in said discharge outlet; means for controlling the valve openings in said valve means of said discharge outlet and so controlling discharge of refuse from said tank in response to variations in the density of said fluid mass present within said separator; and means for removing said desired solid fraction from said tank.

15. In a separator apparatus utilizing a high density fluid mass, in combination, a tank for hydraulic liquid; means for introducing into said tank materials to be separated; means for removing at the upper portion of said tank the lighter fractions of said separated material; discharge means for removing at the lower portion of said tank the heavier fractions of said separated material; valve means controlling the operation of said discharge means; means for controlling the operation of said valve means in response to variations in the density of the fluid mass within said tank, whereby the discharge of said heavier materials is so controlled as to provide a permanent undischarged bed of solid materials within said tank constituting said high density fluid mass; and means for applying to said tank a plurality of continuously applied hydraulic streams of increasing intensity whereby said permanent undischarged bed of solid materials within said tank is expanded within said tank, thus forcing out lighter fractions of said introduced mass and displacing them at the upper portion of said tank.

16. In a separator apparatus utilizing a high density fluid mass comprising a suspension of solid bodies in liquid wherein the materials to be classified are displaced horizontally by positive displacement means to positions at which they come under the influence of a plurality of continuously applied hydraulic currents, means for introducing solid materials to be separated by the action of said high density fluid mass into said high density fluid mass, means for applying thereto a plurality of continuously applied hydraulic currents, means for discharging from said apparatus the lighter bodies present in said introduced mass which do not sink through said high density fluid mass, and automatic means, controlled in response to variations in density of said high density fluid mass, for discharging from said apparatus only sufficient of the heavier bodies present in said introduced mass to permanently maintain within said apparatus said high density fluid mass.

17. In a separator apparatus utilizing a high density fluid mass comprising a suspension of solid bodies in liquid wherein the materials to be classified are displaced horizontally by positive displacement means to positions at which they come under the influence of a plurality of continuously applied hydraulic currents, means for introducing solid bodies to be classified into contact with said high density fluid mass, means for applying thereto a plurality of continuously applied hydraulic currents, and means for discharging from said apparatus only sufficient of said introduced solid bodies to parmanently maintain said high density fluid mass, said discharge means being automatically regulated in response to variations in the density of said fluid mass.

18. In a separator having a tank provided with circumferentially extending wall portions, a rotating zoner member, said rotating zoner member comprising an inner annular supporting member, a plurality of radially extending blades secured to said supporting member, and an outer annular stiffening rib adjacent to but out of contact with the outer terminal portions of said blades, said blades being provided at their terminal portions with flexible scraper members designed to provide sealing contact with the circumferentially extending wall portions of said tank in which said zoner member is adapted to be positioned.

19. In a separator, provided with a housing, a rotating zoner member comprising a centrally positioned supporting shaft, a plurality of radially extending blades, supporting members for securing said blades to said shaft, an annular stiffening member extending circumferentially of said blades and positioned adjacent to but out of contact with the outer terminal portions thereof, the outer terminal portions and the lowermost portions of said radially extending blades being provided with flexible scraper members adapted to press up against and provide sealing contact with the housing in which said rotating zoner member is adapted to rotate.

20. In a hydraulic separator for the classification of materials by the action of upward hydraulic currents, a vertically extending tank, generally circular in cross section, a plurality of plates provided with valve openings for the control of said upward hydraulic currents, said hydraulic currents passing through said valve openings, one plate thereof constituting an upper plate and the other constituting a lower plate, means secured to said vertically extending tank for supporting one of said plates therefrom, means for supporting the second of said plates from said first plate by yieldable means permitting lateral adjustment of said first plate with respect to said second plate, and means including a laterally extending rotatable operating rod adapted to coact with said yieldable supporting means for moving one of said plates with respect to the other in order to vary the extent of the valve openings therebetween.

21. In a separator apparatus, a dual-control refuse discharge outlet comprising upper valve means which include a plurality of plates with mating valve openings therebetween, lower valve means comprising a flexible member enclosing a discharge orifice in communication with said mating valve openings, and means for flexing said flexible member in order to control the size of said valve opening through said discharge orifice, the discharge of refuse through said discharge outlet being controlled conjointly by said first-named valve means and said last-named valve opening through said discharge orifice.

22. In a separator apparatus, in combination, a substantially circular tank for hydraulic liquid, a receptacle for transporting materials to be separated mounted in said tank for horizontal travel therein, said receptacle having an open top to provide for the discharge therethrough of hydraulically lifted material, and means including a plurality of radially extending vanes, the spaces between said vanes being in communication with said receptacle, said vanes being positioned in said tank below said receptacle and serving to inhibit horizontal movement of materials introduced into said tank for classification as said receptacle transports said materials by horizontal rotation of said receptacle.

23. In a hydraulic separator, including weir discharge means, material-transporting receptacles, and a plurality of valves and orifice plate assemblies, the combination which comprises a vertically extending tank comprising four separate housing members, one positioned vertically upon the other, said uppermost member comprising a supporting structure for weir discharge means, said second member comprising a supporting structure for material-transporting receptacles, said third member comprising a supporting structure for a plurality of valve and orifice plate assemblies, and said lowermost member enclosing a chamber the entrance to which is adapted to be controlled by a valve and constituting a reservoir casting wherein there is provided reservoir means for supplying hydraulic liquid to said apparatus.

24. In a separator apparatus, an adjustable weir comprising a sheet metal member inclined upwardly at an angle, the upper edge thereof constituting the weir edge and the lower edge thereof constituting a bent portion positioned for movement in a guide, a guide attached to said separator apparatus, said bent portion being positioned therein and adapted to slide in said guide, a flexible member rigidly secured at one end thereof to said sheet metal member, and means for lowering or raising the elevation of said weir surface by pressing said sheet metal member downwardly or upwardly against the action of said flexible member, said bent portion of said sheet metal member moving upwardly or downwardly in said guide member as the elevation of said weir surface is raised or lowered.

25. In a separator apparatus, a valve plate comprising a plate member provided with a plurality of valve apertures and a stiffening rib attached to said plate member, said stiffening rib being formed at one end thereof with an aperture designed to receive an operating member for adjusting said valve plate with respect to another similar valve plate in order to adjust the valve openings therebetween, and said valve plate being provided with a plurality of bore holes positioned adjacent said valve apertures and parallel therewith but separate therefrom, and being adapted to seat securement means for securing said valve plate to a supporting member therefor.

26. In a separator apparatus positioned in a circumferentially extending housing, a stationary zoner member comprising an inner annular member, a plurality of radially extending blades extending part way around the circumference of said inner annular member, said radially extending blades being attached at their outermost portion to the circumferential wall of the housing in which said stationary zoner member is adapted to be positioned, and upper and lower plate members attached to at least two adjacent blades and enclosing the space therebetween, there being provided a totally enclosed space between said two adjacent blades and between said inner annular member and said housing.

27. The method of separating from each other bodies that are amenable to hydraulic separation, which method comprises: bringing a mass of such bodies under the influence of a suspension of solid bodies in liquid, said suspension constituting an expansible high density fluid mass and said suspended solid bodies comprising bodies of apparent specific gravity and size similar to part of those present in said mass undergoing separation; expanding said expansible high density fluid mass by continuously applied hydraulic currents in order positively to displace and remove lighter bodies present in said mass undergoing separation, said lighter bodies being displaced upwardly by the expansion of said high density fluid mass; and removing bodies of apparent specific gravity greater than that of those fractions displaced upwardly by said high density fluid mass, the amount of said bodies of greater specific gravity removed being so controlled as permanently to maintain in suspension solid bodies comprising said expansible high density fluid mass, said discharge of said bodies of greater specific gravity being controlled in response to variations in the density of said high density fluid mass, and independent of variations caused solely by the expansion thereof.

FRANK E. SMITH.

CERTIFICATE OF CORRECTION.

Patent No. 2,334,683.　　　　　　　　　　　　　November 16, 1943.

FRANK E. SMITH.

It is hereby certified that error appears in the printed specification of the above numbered patent requiring correction as follows: Page 5, second column, line 10, after "of" insert --each of--; line 26, for "102" read --202--; page 6, second column, line 1 and page 7, first column, line 18, for "drawings" read --drawing--; page 10, first column, line 15, for "casing" read --casting--; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.